United States Patent
Yu et al.

(10) Patent No.: US 12,446,096 B2
(45) Date of Patent: Oct. 14, 2025

(54) METHOD AND DEVICE IN COMMUNICATION NODE FOR WIRELESS COMMUNICATION

(71) Applicant: BUNKER HILL TECHNOLOGIES LLC, Allen, TX (US)

(72) Inventors: Qiaoling Yu, Shanghai (CN); Xiaobo Zhang, Shanghai (CN)

(73) Assignee: BUNKER HILL TECHNOLOGIES LLC, Allen, TX (US)

( * ) Notice: Subject to any disclaimer, the term of this patent is extended or adjusted under 35 U.S.C. 154(b) by 355 days.

(21) Appl. No.: 18/140,620

(22) Filed: Apr. 28, 2023

(65) Prior Publication Data

US 2023/0284327 A1 Sep. 7, 2023

Related U.S. Application Data

(63) Continuation of application No. PCT/CN2021/128612, filed on Nov. 4, 2021.

(30) Foreign Application Priority Data

Nov. 5, 2020 (CN) .......................... 202011222994.3

(51) Int. Cl.
*H04W 76/25* (2018.01)
*H04W 76/19* (2018.01)
*H04W 76/30* (2018.01)

(52) U.S. Cl.
CPC ........... *H04W 76/25* (2018.02); *H04W 76/19* (2018.02); *H04W 76/30* (2018.02)

(58) Field of Classification Search
None
See application file for complete search history.

(56) References Cited

U.S. PATENT DOCUMENTS

| | | |
|---|---|---|
| 2018/0069618 A1 | 3/2018 | Loehr |
| 2019/0306765 A1 | 10/2019 | Cirik et al. |

(Continued)

FOREIGN PATENT DOCUMENTS

| | | |
|---|---|---|
| CN | 106233697 A | 12/2016 |
| CN | 110402599 A | 11/2019 |

(Continued)

OTHER PUBLICATIONS

First Office Action of Chinese patent application No. CN202011222994.3 dated Feb. 29, 2024.

(Continued)

*Primary Examiner* — Anh Vu H Ly
(74) *Attorney, Agent, or Firm* — Ascenda Law Group, PC

(57) ABSTRACT

The present application provides a method and a device in a communication node for wireless communications. A communication node receives a first signaling; sets contents of a second message at a first moment; transmits a first radio signal, the first radio signal comprises the second message; at a second moment, as a response to not receiving a third message, determines performing a first procedure; the first signaling is used to determine a first time length; the second message comprises link maintenance related information; the third message is triggered by the second message; the second moment is after the first moment and its interval with the first moment is a second time length. Aiming at the problem of increased delay brought by relay communications, the present application proposes a scheme for delaying a determination of a first procedure to avoid triggering the first procedure to early.

20 Claims, 7 Drawing Sheets

(56) References Cited

U.S. PATENT DOCUMENTS

| | | | |
|---|---|---|---|
| 2019/0384816 A1 | 12/2019 | Taehun | |
| 2020/0059877 A1* | 2/2020 | Zhang | |
| 2022/0030493 A1* | 1/2022 | Hong | H04L 1/1896 |
| 2023/0180098 A1* | 6/2023 | Harounabadi | H04W 40/24 |
| | | | 370/315 |
| 2023/0328828 A1* | 10/2023 | Wu | H04W 76/18 |
| | | | 370/315 |

FOREIGN PATENT DOCUMENTS

| | | | | |
|---|---|---|---|---|
| CN | 110832890 A | 2/2020 | | |
| WO | 2018182286 A1 | 10/2018 | | |
| WO | WO-2021146702 A1 * | 7/2021 | | H04W 72/20 |
| WO | WO-2021248096 A1 * | 12/2021 | | H04W 8/005 |
| WO | WO-2022083931 A1 * | 4/2022 | | H04L 5/0055 |

OTHER PUBLICATIONS

First Search Report of Chinese patent application No. CN202011222994.3 dated Feb. 27, 2024.
Supplementary European Search Report of U.S. Appl. No. 21/888,614 dated Feb. 21, 2024.
Huawei et al: "CR on 38.331 for RRC Resume Request and RRCResume Request1 and protection of RRCResumeRequest1", 3GPP Draft;38331_CR0714R1_(REL-15)_R2-1818977,3RDGeneration Partnership Project(3GPP),Mobile Competence Centre ;650, Route Deslucioles ;F-06921 Sophia-Antipolis Cedexfrance.
ISR received in application No. PCT/CN2021/128612 dated Jan. 25, 2022.

* cited by examiner

METHOD AND DEVICE IN COMMUNICATION NODE FOR WIRELESS COMMUNICATION

CROSS REFERENCE TO RELATED APPLICATIONS

This application is the continuation of the international patent application No. PCT/CN2021/128612, field on Nov. 4, 2021, and claims the priority benefit of Chinese Patent Application 202011222994.3, filed on Nov. 5, 2020, the full disclosure of which is incorporated herein by reference.

BACKGROUND

Technical Field

The present application relates to transmission methods and devices in wireless communication systems, and in particular to a transmission method and device related to relay.

Related Art

Application scenarios of future wireless communication systems are becoming increasingly diversified, and different application scenarios have different performance demands on systems. In relay communications, data from a transmitting node is forwarded to a destination node through a relay node (RN), which can improve throughput and coverage performance. To meet these various performance requirements, 3rd Generation Partner Project (3GPP) Radio Access Network (RAN) #72 Plenary decided to study New Radio (NR), or what is called the Fifth Generation (5G), and later at 3GPP RAN #75 Plenary, a Work Item (WI) was approved to standardize NR. Targeting at rapidly developing Vehicle-to-Everything (V2X) traffic, 3GPP also started SL standardization formulation and research work under NR framework. At 3GPP RAN #86 plenary, it was decided to start Study Item (SI) standardization work for NR SL Relay, comprising a UE-to-UE relay and a UE-to-Network relay.

SUMMARY

When data is forwarded through a relay, factors such as the forwarding efficiency of the relay, the number of relays, and the link performance from the relay to the receiving end can lead to an extension of data transmission time.

To address the above problem, the present application provides a solution. In view of the above problem, the UE-UE relay scenario is used as an example; the present application is also applicable to scenarios such as a UE-network relay, a network-network relay, an IAB, and great latency communications, where similar technical effects can be achieved. Additionally, the adoption of a unified solution for various scenarios contributes to the reduction of hardware complexity and costs.

In one embodiment, interpretations of the terminology in the present application refer to definitions given in the 3GPP TS36 series.

In one embodiment, interpretations of the terminology in the present application refer to definitions given in the 3GPP TS38 series.

In one embodiment, interpretations of the terminology in the present application refer to definitions given in the 3GPP TS23 series.

In one embodiment, interpretations of the terminology in the present application refer to definitions given in Institute of Electrical and Electronics Engineers (IEEE) protocol specifications.

It should be noted that if no conflict is incurred, embodiments in any node in the present application and the characteristics of the embodiments are also applicable to any other node, and vice versa. And the embodiments in the present application and the characteristics in the embodiments can be arbitrarily combined if there is no conflict.

The present application provides a method in a first node for wireless communications, comprising:
receiving a first signaling;
setting contents of a second message at a first moment; transmitting a first radio signal, the first radio signal comprising the second message; and
at a second moment, as a response to not receiving a third message, determining performing a first procedure;
herein, the first signaling is used to determine a first time length; the second message comprises link maintenance related information; the third message is triggered by the second message; the second moment is after the first moment and its interval with the first moment is a second time length, and the first time length is used to determine the second time length; the second time length is related to whether the second message is relayed.

In one embodiment, a problem to be solved in the present application comprises: when a second message is forwarded through a relay, whether a time receiving a third message needs to be adjusted.

In one embodiment, characteristics of the above method comprise: whether a second message is relayed is used to determine the second time length.

In one embodiment, characteristics of the above method comprise: whether a second message is relayed is used to determine a moment for performing the first procedure.

In one embodiment, characteristics of the above method comprise: a second time length is related to a number of relay(s).

In one embodiment, characteristics of the above method comprise: when the second message is not relayed, the second time length is equal to the first time length.

In one embodiment, characteristics of the above method comprise: when the second message is relayed, the second time length is greater than the first time length.

In one embodiment, characteristics of the above method comprise: when the second message is relayed, extending a time interval used to receive the third message.

In one embodiment, characteristics of the above method comprise: when the second message is relayed, delaying a moment determining to execute the first procedure.

In one embodiment, advantages of the above method comprise: reducing the probability of triggering an RLF.

In one embodiment, advantages of the above method comprise: avoiding triggering an RLF too early.

In one embodiment, advantages of the above method comprise: being beneficial for link maintenance.

According to one aspect of the present application, comprising:
receiving a second signaling;
herein, the second signaling indicates a first offset, the first offset and the first time length are used to determine the second time length.

In one embodiment, characteristics of the above method comprise: configuring the first offset through an RRC signaling.

According to one aspect of the present application, comprising:
  when a running time of a first timer reaches the first time length, determining that the first timer is expired; a moment when the first timer is expired being used to determine the second moment;
  herein, a third moment is used to determine starting the first timer; the third moment is after the first moment, and an interval between the third moment and the first moment is equal to the first offset.

In one embodiment, characteristics of the above method comprise: when a start condition of the first timer is met, after delaying the first offset, then starting the first timer.

In one embodiment, advantages of the above method comprise: avoiding starting the first timer to early.

According to one aspect of the present application, comprising:
  when a running time of a first timer is equal to the second time length, determining that the first timer is expired; a moment when the first timer is expired is used to determine the second moment;
  herein, the first moment is used to determine starting the first timer.

In one embodiment, characteristics of the above method comprise: delaying a maximum running time of the first timer.

In one embodiment, characteristics of the above method comprise: an expiration value of the first timer delays the first offset.

According to one aspect of the present application, comprising:
  receiving a first feedback; as a response to receiving the first feedback, starting a first timer; a running time of the first timer reaching the first time length is used to determine that the first timer is expired; a moment when the first timer is expired is used to determine the second moment;
  herein, the first feedback is used to determine that the first radio signal is relayed and forwarded.

In one embodiment, characteristics of the above method comprise: when the second message is relayed,
  the first timer is only started upon receiving feedback information from a relay node for the second message being forwarded.

In one embodiment, advantages of the above method comprise: avoiding starting the first timer to early.

According to one aspect of the present application, it is characterized in that the second message carries first information, and the first information is used to trigger the first feedback.

The present application provides a method in a second node for wireless communications, comprising:
  monitoring a first radio signal, the first radio signal comprising a second message; and
  as a response to receiving the first radio signal, transmitting a second radio signal, the second radio signal comprising a second message; or, as a response to not receiving the first radio signal, dropping transmitting a second radio signal;
  herein, a first signaling is received by a transmitter of the first radio signal; the first signaling is used to determine a first time length; the second message comprises link maintenance related information; contents of the second message are set at a first moment; at a second moment, as a response to not receiving a third message, a first procedure is determined to be performed; the third message is triggered by the second message; the second moment is after the first moment and its interval with the first moment is a second time length, and the first time length is used to determine the second time length; the second time length is related to whether the second message is relayed.

According to one aspect of the present application, it is characterized in that a second signaling is received by a transmitter of the first radio signal; the second signaling indicates a first offset, the first offset and the first time length are used to determine the second time length.

According to one aspect of the present application, it is characterized in that a running time of a first timer reaching the first time length is used to determine that the first timer is expired; a moment when the first timer is expired is used to determine the second moment; a third moment is used to determine starting the first timer; the third moment is after the first moment, and an interval between the third moment and the first moment is equal to the first offset.

According to one aspect of the present application, it is characterized in that a running time of a first timer being equal to the second time length is used to determine that the first timer is expired; a moment when the first timer is expired is used to determine the second moment; the first moment is used to determine starting the first timer.

According to one aspect of the present application, comprising:
  transmitting a first feedback;
  herein, as a response to receiving the first feedback, a first timer is started; a running time of the first timer reaching the first time length is used to determine that the first timer is expired; a moment when the first timer is expired is used to determine the second moment; the first feedback is used to determine that the first radio signal is relayed and forwarded.

According to one aspect of the present application, it is characterized in that the second message carries first information, and the first information is used to trigger the first feedback.

The present application provides a method in a third node for wireless communications, comprising:
  monitoring a second radio signal, the second radio signal comprising a second message; and
  as a response to receiving the second message, transmitting a third message; or, as a response to not receiving the second message, dropping transmitting a third message;
  herein, a first radio signal is transmitted, the first radio signal comprises the second message; a first signaling is used to determine a first time length; the second message comprises link maintenance related information; contents of the second message are set at a first moment; at a second moment, as a response to not receiving a third message, a first procedure is determined to be performed; the third message is triggered by the second message; the second moment is after the first moment and its interval with the first moment is a second time length, and the first time length is used to determine the second time length; the second time length is related to whether the second message is relayed.

According to one aspect of the present application, it is characterized in that the second signaling indicates a first offset, the first offset and the first time length are used to determine the second time length.

According to one aspect of the present application, it is characterized in that a running time of a first timer reaching the first time length is used to determine that the first timer is expired; a moment when the first timer is expired is used to determine the second moment; a third moment is used to determine starting the first timer; the third moment is after the first moment, and an interval between the third moment and the first moment is equal to the first offset.

According to one aspect of the present application, it is characterized in that a running time of a first timer being equal to the second time length is used to determine that the first timer is expired; a moment when the first timer is expired is used to determine the second moment; the first moment is used to determine starting the first timer.

According to one aspect of the present application, comprising: a first feedback is received; as a response to receiving the first feedback, a first timer is started; a running time of the first timer reaching the first time length is used to determine that the first timer is expired; a moment when the first timer is expired is used to determine the second moment; herein, the first feedback is used to determine that the first radio signal is relayed and forwarded.

According to one aspect of the present application, it is characterized in that the second message carries first information, and the first information is used to trigger the first feedback.

The present application provides a first node for wireless communications, comprising:
 a first receiver, receiving a first signaling; at a second moment, as a response to not receiving a third message, determining performing a first procedure; and
 a first transmitter, setting contents of a second message at a first moment; transmitting a first radio signal, the first radio signal comprising the second message;
 herein, the first signaling is used to determine a first time length; the second message comprises link maintenance related information; the third message is triggered by the second message; the second moment is after the first moment and its interval with the first moment is a second time length, and the first time length is used to determine the second time length; the second time length is related to whether the second message is relayed.

The present application provides a second node for wireless communications, comprising:
 a second receiver, monitoring a first radio signal, the first radio signal comprising a second message; and
 a second transmitter, as a response to receiving the first radio signal, transmitting a second radio signal, the second radio signal comprising a second message; or, as a response to not receiving the first radio signal, dropping transmitting a second radio signal;
 herein, a first signaling is received by a transmitter of the first radio signal; the first signaling is used to determine a first time length; the second message comprises link maintenance related information; contents of the second message are set at a first moment; at a second moment, as a response to not receiving a third message, a first procedure is determined to be performed; the third message is triggered by the second message; the second moment is after the first moment and its interval with the first moment is a second time length, and the first time length is used to determine the second time length; the second time length is related to whether the second message is relayed.

The present application provides a third node for wireless communications, comprising:
 a third receiver, monitoring a second radio signal, the second radio signal comprising a second message; and
 a third transmitter, as a response to receiving the second message, transmitting a third message; or, as a response to not receiving the second message, dropping transmitting a third message;
 herein, a first radio signal is transmitted, the first radio signal comprises the second message; a first signaling is used to determine a first time length; the second message comprises link maintenance related information; contents of the second message are set at a first moment; at a second moment, as a response to not receiving a third message, a first procedure is determined to be performed; the third message is triggered by the second message; the second moment is after the first moment and its interval with the first moment is a second time length, and the first time length is used to determine the second time length; the second time length is related to whether the second message is relayed.

In one embodiment, the present application has the following advantages over conventional schemes:
 reducing the probability of triggering an RLF;
 avoiding triggering an RLF too early;
 avoiding starting the first timer to early;
 being beneficial for link maintenance.

BRIEF DESCRIPTION OF THE DRAWINGS

Other features, objects and advantages of the present application will become more apparent from the detailed description of non-restrictive embodiments taken in conjunction with the following drawings.

DESCRIPTION OF THE EMBODIMENTS

The technical scheme of the present application is described below in further details in conjunction with the drawings. It should be noted that the embodiments of the present application and the characteristics of the embodiments may be arbitrarily combined if no conflict is caused.

Embodiment 1

Figure 1:
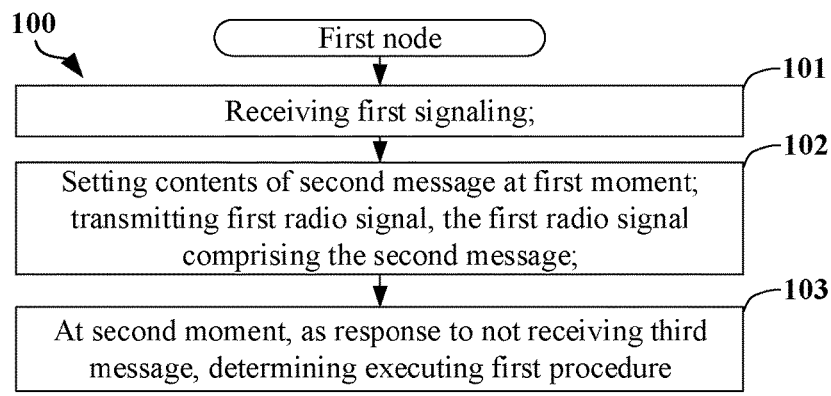
FIG. 1 illustrates a flowchart of transmission of a first signaling, a first radio signal, a second message and a third message according to one embodiment of the present application.

Embodiment 1 illustrates a flowchart of transmission of a first signaling, a first radio signal, a second message and a third message according to one embodiment of the present application, as shown in FIG. 1. In FIG. 1, each step represents a step, it should be particularly noted that the sequence order of each box herein does not imply a chronological order of steps marked respectively by these boxes.

In Embodiment 1, a first node in the present application receives a first signaling in step 101; in step 102, sets contents of a second message at a first moment; transmits a first radio signal, the first radio signal comprises the second message; in step 103, at a second moment, as a response to not receiving a third message, determines performing a first procedure; herein, the first signaling is used to determine a first time length; the second message comprises link maintenance related information; the third message is triggered by the second message; the second moment is after the first moment and its interval with the first moment is a second time length, and the first time length is used to determine the second time length; the second time length is related to whether the second message is relayed.

In one embodiment, a transmitter of the first signaling comprises the second node in the present application.

In one embodiment, a transmitter of the first signaling comprises the fourth node in the present application.

In one embodiment, a transmitter of the first signaling comprises a BaseStation (BS).

In one embodiment, a transmitter of the first signaling comprises a User Equipment (UE).

In one embodiment, the first signaling is transmitted via an air interface.

In one embodiment, the first signaling is transmitted via an antenna port.

In one embodiment, the first signaling is transmitted via a higher-layer signaling.

In one embodiment, the first signaling is transmitted via a higher-layer signaling.

In one embodiment, the first signaling comprises a sidelink signal.

In one embodiment, the first signaling comprises a sidelink.

In one embodiment, the first signaling comprises a Downlink (DL) signal.

In one embodiment, the first signaling comprises all or part of a high-layer signaling.

In one embodiment, the first signaling comprises all or part of a higher-layer signaling.

In one embodiment, the first signaling comprises an RRCReconfiguration message.

In one embodiment, the first signaling comprises an RRCResume message.

In one embodiment, the first signaling comprises an RRCSetup message.

In one embodiment, the first signaling comprises an SIB12 message.

In one embodiment, the first signaling comprises an RRCReestablishment message.

In one embodiment, the first signaling comprises an RRCConnectionReconfiguration message.

In one embodiment, the first signaling comprises an RRCConnectionReestablishment message.

In one embodiment, the first signaling comprises an RRCConnectionResume message.

In one embodiment, the first signaling comprises an RRCConnectionSetup message.

In one embodiment, the first signaling comprises an IE in a Radio Resource Control (RRC) message, and a name of the IE comprises CellGroupConfig.

In one embodiment, the first signaling comprises an IE in an RRC message, and a name of the IE comprises SL-RLC-Config.

In one embodiment, the first signaling comprises an IE in an RRC message, and a name of the IE comprises SL-RLC-BearerConfig.

In one embodiment, the first signaling comprises an IE in an RRC message, and a name of the IE comprises SL-ConfigDedicatedNR.

In one embodiment, the first signaling comprises an IE in an RRC message, and a name of the IE comprises BH-RLC-ChannelConfig.

In one embodiment, the first signaling comprises an IE in an RRC message, and a name of the IE comprises BH-LogicalChannelIdentity-Ext.

In one embodiment, the first signaling comprises an IE in an RRC message, and a name of the IE comprises RadioResourceConfigDedicated.

In one embodiment, the first signaling comprises an IE in an RRC message, and a name of the IE comprises RLC-BearerConfig.

In one embodiment, the first signaling comprises an IE in an RRC message, and a name of the IE comprises RLC-Config.

In one embodiment, the first signaling comprises a field in an RRC message, and a name of the field comprises UL-AM-RLC.

In one embodiment, the first signaling comprises a field in an RRC message, and a name of the field comprises t-PollRetransmit.

In one embodiment, the first signaling comprises a field in an RRC signaling, and a name of the field comprises t400.

In one embodiment, the first signaling comprises a Maximum Inactivity Period IE.

In one embodiment, the phrase that the first signaling is used to determine a first time length comprises: the first time length is a field in the first signaling.

In one embodiment, the phrase that the first signaling is used to determine a first time length comprises:

the first time length is configured through the first signaling.

In one embodiment, the phrase that the first signaling is used to determine a first time length comprises: the first time length is indicated through the first signaling.

In one subembodiment of the embodiment, the first signaling explicitly indicates the first time length.

In one subembodiment of the embodiment, the first signaling implicitly indicates the first time length.

In one embodiment, the first time length comprises a value of t400.

In one embodiment, the first time length comprises a value of T4101.

In one embodiment, the first time length comprises a value of T4102.

In one embodiment, the first time length comprises a value of T-PollRetransmit.

In one embodiment, the first time length is configurable.

In one embodiment, the first time length is pre-configured.

In one embodiment, the first time length is unrelated to whether the second message is relayed.

In one embodiment, the first time length is related to whether the second message is relayed.

In one embodiment, the first time length comprises at least one ms.

In one embodiment, the first time length comprises at least one slot, the slot comprises at least one of slot, or subframe, or Radio Frame, or multiple Orthogonal Frequency Division Multiplexing (OFDM) symbols, or multiple Single Carrier Frequency Division Multiple Access (SC-FDMA) symbols.

In one embodiment, the phrase that the second message comprises link maintenance related information comprises: the second message is used for link maintenance.

In one embodiment, the phrase that the second message comprises link maintenance related information comprises: the second message is related to link maintenance.

In one embodiment, the phrase that the second message comprises link maintenance related information comprises: the second message is related to link reliability.

In one embodiment, the phrase that the second message comprises link maintenance related information comprises: the second message is related to a Radio Link Control (RLC) Acknowledged Mode (AM).

In one embodiment, the phrase that the second message comprises link maintenance related information comprises: the second message is related to retransmission.

In one embodiment, the link maintenance comprises an RRC connection reconfiguration.

In one embodiment, the link maintenance comprises an RRC connection re-establishment.

In one embodiment, the link maintenance comprises an RRC connection release.

In one embodiment, the link maintenance comprises an RRC connection recovery.

In one embodiment, the link maintenance comprises keep-alive.

In one embodiment, the link maintenance comprises an Automatic Repeat request (ARQ).

In one embodiment, a receiver of the second message comprises a relay node.

In one embodiment, a receiver of the second message comprises a destination node.

In one embodiment, a receiver of the second message comprises the second node in the present application.

In one embodiment, a receiver of the second message comprises the third node in the present application.

In one embodiment, a receiver of the second message comprises a UE.

In one embodiment, a receiver of the second message comprises a base station.

In one embodiment, the second message is transmitted via an air interface.

In one embodiment, the second message is transmitted via an antenna port.

In one embodiment, the second message is transmitted via a high-layer signaling.

In one embodiment, the second message is transmitted via a higher-layer signaling.

In one embodiment, the second message comprises an uplink signal.

In one embodiment, the second message comprises a uu interface message.

In one embodiment, the second message comprises a sidelink signal.

In one embodiment, the second message comprises a sidelink message.

In one embodiment, the second message comprises a PC5 message.

In one embodiment, the second message comprises a PC5 RRC message.

In one embodiment, a Signalling radio bearer (SRB) of the second message comprises an SL-SRB3.

In one embodiment, an RLC-SAP of the second message comprises an AM.

In one embodiment, an RLC-SAP of the second message comprises an Unacknowledged Mode (UM).

In one embodiment, an RLC-SAP of the second message comprises a Transparent Mode (TM).

In one embodiment, the second message comprises data of an RLC layer.

In one embodiment, the second message comprises an RLC control Protocol Data Unit (PDU).

In one embodiment, the second message comprises an AMD PDU.

In one embodiment, the second message comprises an RLC Service Data Unit (SDU) or an RLC SDU segment.

In one embodiment, the second message comprises a Non Access Stratum (NAS) message.

In one embodiment, the second message comprises a PC5 Signaling message.

In one embodiment, the second message comprises all or part of a high-layer signaling.

In one embodiment, the second message comprises all or part of a higher-layer signaling.

In one embodiment, the second message comprises a Layer 3 (L3) message.

In one embodiment, the second message comprises a standard L3 message.

In one embodiment, the second message comprises an RRC message.

In one embodiment, the second message comprises one or multiple IEs in an RRC message.

In one embodiment, the second message comprises one or multiple fields in an RRC message.

In one embodiment, a Signalling radio bearer (SRB) of the second message comprises SRB0, or SRB1, or SRB2, or SRB3, or SL-SRB3 or SL-SRB3.

In one embodiment, a logical channel of the second message comprises a Sidelink Control Channel (SCCH).

In one embodiment, a logical channel of the second message comprises a Dedicated Control Channel (DCCH).

In one embodiment, a logical channel of the second message comprises a Common Control Channel (CCCH).

In one embodiment, the second message comprises a field in an RRC message, and a name of the field comprises SLRB-Config.

In one embodiment, the second message comprises a field in an RRC message, and a name of the field comprises SL-SDAP-ConfigPC5.

In one embodiment, the second message comprises a field in an RRC message, and a name of the field comprises SL-RLC-ConfigPC5.

In one embodiment, the second message comprises a field in an RRC message, and a name of the field comprises SL-CSI-RS-Config.

In one embodiment, the second message comprises an IE in an RRC message, and a name of the IE comprises RRCReconfigurationSidelink.

In one embodiment, the second message comprises an RRCReconfigurationSidelink message.

In one embodiment, the second message comprises an RRCReestablishmentSidelink message.

In one embodiment, the second message comprises an RRCReleaseSidelink message.

In one embodiment, the second message comprises an RRCSetupSidelink message.

In one embodiment, the second message comprises an RRCResumeSidelink message.

In one embodiment, the second message comprises an RRCSetupRequest message.

In one embodiment, the second message comprises an RRCReestabilshmentRequest message.

In one embodiment, the second message comprises a measurementreport message.

In one embodiment, the second message comprises an MCGFailureInformation message.

In one embodiment, the second message comprises an RRCResumeRequest message or an RRCResumeRequest1 message.

In one embodiment, the second message comprises a UEAssistanceInformation message.

In one embodiment, the second message comprises a DedicatedSIBRequest message.

In one embodiment, the second message comprises an RRCSetupRequest message.

In one embodiment, the second message comprises an RRCEarlyDataRequest message.

In one embodiment, the second message comprises an RRCConnectionRequest message.

In one embodiment, the second message comprises an RRCConnectionResumeRequest message.

In one embodiment, the second message comprises an RRCConnectionReestabilshmentRequest message.

In one embodiment, the second message comprises a P field.

In one embodiment, the second message comprises a data field.

In one embodiment, the second message comprises a Sequence Number (SN) field.

In one embodiment, the second message comprises a Keep-alive message.

In one embodiment, the second message comprises a DIRECT_COMMUNICATION_KEEPALIVE message.

In one embodiment, the meaning of the phrase of setting contents of a second message at a first moment comprises: contents of the second message being set at the first moment.

In one embodiment, the meaning of the phrase of setting contents of a second message at a first moment comprises: starting setting contents of the second message at the first moment.

In one embodiment, the meaning of the phrase of setting contents of a second message at a first moment comprises: a moment when setting contents of the second message is completed is the first moment.

In one embodiment, the first moment refers to any moment on time.

In one embodiment, the first moment refers to a specific moment.

In one embodiment, the first moment refers to a specific time.

In one embodiment, the first moment refers to a moment when setting contents of the second message is completed.

In one embodiment, the first moment refers to a moment when contents of the second message start being set.

In one embodiment, the first moment is related to setting contents of the second message.

In one embodiment, the setting comprises set.

In one embodiment, the setting comprises padding.

In one embodiment, the setting comprises assigning a value to a field.

In one embodiment, the setting comprises setting values of one or multiple IEs in a message.

In one embodiment, the setting comprises setting a value in one or multiple fields in an IE in a message.

In one embodiment, contents in the second message comprise a field in the second message.

In one embodiment, contents in the second message comprise an IE in the second message.

In one embodiment, contents in the second message comprise space in the second message.

In one embodiment, the behavior of setting contents of a second message comprises setting contents of an SLRB-PC5-ConfigIndex.

In one embodiment, the behavior of setting contents of a second message comprises setting contents of SLRB-Config.

In one embodiment, the behavior of setting contents of a second message comprises setting contents of sl-MeasConfig.

In one embodiment, the behavior of setting contents of a second message comprises for each sidelink DRB to be released, set an SLRB-PC5-ConfigIndex in a slrb-Config-ToReleaseList as a corresponding sidelink DRB.

In one embodiment, the behavior of setting contents of a second message comprises for a sidelink DRB to be established or modified, according to received sl-RadioBearer-Config and sl-RLC-BearerConfig, set SLRB-Config in an slrb-ConfigToAddModList as a corresponding sidelink DRB.

In one embodiment, the behavior of setting contents of a second message comprises for a sidelink DRB to be established or modified, set sl-MeasConfig according to NR sidelink measurement configuration information of a stored destination node.

In one embodiment, the behavior of setting contents of a second message comprises setting a P field.

In one embodiment, the behavior of setting contents of a second message comprises setting a P field in an Acknowledged Mode Data (AMD) PUD to 1.

In one embodiment, the behavior of setting contents of a second message comprises setting a value of a keepalive counter IE.

In one embodiment, the phrase that the first radio signal comprises the second message comprises: the first radio signal comprises all information in the second message.

In one embodiment, the phrase that the first radio signal comprises the second message comprises: the first radio signal comprises partial information in the second message.

In one embodiment, the phrase that the first radio signal comprises the second message comprises: the first radio signal is a signal corresponding to that the second message is delivered to a lower layer.

In one embodiment, the phrase that the first radio signal comprises the second message comprises: the second message is delivered to a lower layer by a source node, and a signal of the second message at the lower layer is the first radio signal.

In one subembodiment of the embodiment, a protocol layer generating the first radio signal is a lower layer generating a protocol layer of the second message.

In one embodiment, the first radio signal comprises an RLC data PDU.

In one embodiment, the first radio signal comprises an RLC control PDU.

In one embodiment, the first radio signal comprises a TM Data (TMD) PDU.

In one embodiment, the first radio signal comprises a UM Data (UMD) PDU.

In one embodiment, the first radio signal comprises an AMD PDU.

In one embodiment, the first radio signal comprises the P field.

In one subembodiment of the above embodiment, the P field comprises a bit.

In one subembodiment of the above embodiment, the P field is used to indicate whether a transmitting side of an AM RLC entity requests a STATUS report from its peer AM RLC entity.

In one subsidiary embodiment of the subembodiment, when a value of the P field is equal to 0, it represents that the STATUS report is not requested.

In one subsidiary embodiment of the subembodiment, when a value of the P field is equal to 1, it represents that the STATUS report is requested.

In one embodiment, the first radio signal comprises a first Medium Access Control (MAC) PDU set, and the first MAC PDU set comprises at least one MAC PDU; if each MAC PDU in the first MAC PDU set carries at least partial bits in a first link-layer identity, the second message is through relay; if each MAC PDU in the first MAC PDU set carries at least partial bits in a second link-layer identity, the second message is not through relay.

In one embodiment, the first transmitter transmits a first physical-layer signaling set, the first physical-layer signaling set comprises at least one physical-layer signaling, the first radio signal occupies at least one physical-layer data channel, and each physical-layer signaling in the first physical-layer signaling set comprises configuration information of a physical-layer data channel occupied by the first radio signal.

In one embodiment, each physical-layer data channel occupied by the first radio signal comprises first-type control information; if the first-type control information comprises at least partial bits in a first link-layer identity, the second message is through relay; if the first-type control information comprises at least partial bits in a second link-layer identity, the second message is not through relay.

In one embodiment, the second link-layer identity is used to identify a target receiver of the second message.

In one embodiment, the second link-layer identity is used to identify a generation node of the third message.

In one embodiment, whether the second message is through a relay is used to determine the first time length.

In one embodiment, the second time length is not less than the first time length.

In one embodiment, the phrase of "at a second moment, as a response to not receiving a third message, determining performing a first procedure" comprises: at a second moment, when a third message is not received, determining performing a first procedure.

In one embodiment, the phrase of "at a second moment, as a response to not receiving a third message, determining performing a first procedure" comprises: at a second moment, not receiving a third message is used to trigger the first procedure.

In one embodiment, the phrase of "at a second moment, as a response to not receiving a third message, determining performing a first procedure" comprises: at a second moment, as a response to not receiving a third message between the first moment and the second moment, determining performing a first procedure.

In one embodiment, the phrase of "at a second moment, as a response to not receiving a third message, determining performing a first procedure" comprises: as a response to not receiving the third message from the first moment to the second moment, determining performing a first procedure at a second moment.

In one embodiment, the phrase of "at a second moment, as a response to not receiving a third message, determining performing a first procedure" comprises: as a response to not receiving the third message until the second moment, determining performing a first procedure at a second moment.

In one embodiment, the phrase of not receiving a third message comprises: not detecting the third message.

In one embodiment, the phrase of not receiving a third message comprises: a source node not receiving the third message.

In one embodiment, the second moment refers to any moment on time.

In one embodiment, the second moment refers to a specific moment.

In one embodiment, the second moment refers to a specific time.

In one embodiment, the second moment refers to a moment when a given timer is expired.

In one embodiment, the second moment refers to a moment determining performing a first procedure.

In one embodiment, a given timer is used to determine the second moment.

In one subembodiment of the above embodiment, the second moment comprises an expiration moment of the given timer.

In one embodiment, the second moment comprises a moment determining that the given timer is expired.

In one subembodiment of the above embodiment, the given timer comprises the first timer in the present application.

In one subembodiment of the above embodiment, the given timer comprises a timer of an RRC layer.

In one subembodiment of the above embodiment, the given timer comprises a timer of a PDCP layer.

In one subembodiment of the above embodiment, the given timer comprises a timer of an RLC layer.

In one subembodiment of the above embodiment, the given timer comprises a timer of a MAC layer.

In one subembodiment of the above embodiment, the given timer comprises a timer of a uu interface.

In one subembodiment of the above embodiment, the given timer comprises a timer in sidelink communications.

In one subembodiment of the above embodiment, the given timer is used to determine a maximum time interval receiving the second message.

In one subembodiment of the above embodiment, the given timer comprises timer T400.

In one subembodiment of the above embodiment, the given timer comprises timer T4101.

In one subembodiment of the above embodiment, the given timer comprises timer T300.

In one subembodiment of the above embodiment, the given timer comprises timer T301.

In one subembodiment of the above embodiment, the given timer comprises timer T312.

In one subembodiment of the above embodiment, the given timer comprises timer T316.

In one subembodiment of the above embodiment, the given timer comprises timer T319.

In one subembodiment of the above embodiment, the given timer comprises timer T342.

In one subembodiment of the above embodiment, the given timer comprises timer T345.

In one subembodiment of the above embodiment, the given timer comprises timer T346a.

In one subembodiment of the above embodiment, the given timer comprises timer T346b.

In one subembodiment of the above embodiment, the given timer comprises timer T346c.

In one subembodiment of the above embodiment, the given timer comprises timer T346d.

In one subembodiment of the above embodiment, the given timer comprises timer T346e.

In one subembodiment of the above embodiment, the given timer comprises timer T346f.

In one subembodiment of the above embodiment, the given timer comprises timer T350.

In one subembodiment of the above embodiment, the given timer comprises timer t-PollRetransmit.

In one embodiment, the behavior of determining performing a first procedure comprises: determining occurring a given radio link failure.

In one subembodiment of the embodiment, the given radio link failure comprises an RLF.

In one subembodiment of the embodiment, the given radio link failure refers to an RLF of a uu interface.

In one subembodiment of the embodiment, the given radio link failure refers to an RLF of sidelink.

In one subembodiment of the embodiment, the given radio link failure refers to an RLF between a source node and a destination node.

In one subembodiment of the embodiment, the given radio link failure refers to an RLF between a source node and a relay node.

In one embodiment, the behavior of determining performing a first procedure comprises: determining performing subsequent actions after occurring the given radio link failure.

In one embodiment, the behavior of determining performing a first procedure comprises: determining performing the sidelink RRC reconfiguration failure procedure.

In one embodiment, the behavior of determining performing a first procedure comprises: no action.

In one embodiment, the behavior of determining performing a first procedure comprises: clearing contents other than numberOfConnFail in VarConnEstFailReport; storing VarConnEstFailReport, and setting a field in VarConnEstFailReport to a corresponding value.

In one embodiment, the behavior of determining performing a first procedure comprises: entering into RRC_IDLE state.

In one embodiment, the behavior of determining performing a first procedure comprises: performing an RRC connection re-establishment procedure.

In one embodiment, the behavior of determining performing a first procedure comprises: performing an MCG failure information procedure.

In one embodiment, the behavior of determining performing a first procedure comprises: performing an SCG failure information procedure.

In one embodiment, the behavior of determining performing a first procedure comprises: resetting a MAC.

In one embodiment, the behavior of determining performing a first procedure comprises: re-establishing RLCs of all established RBs.

In one embodiment, the first procedure comprises: sidelink RRC reconfiguration failure procedure.

In one embodiment, the first procedure comprises: releasing a DRB for a given node, and the given node comprises a destination node or a relay node.

In one embodiment, the first procedure comprises: releasing an SRB for a given node, and the given node comprises a destination node or a relay node.

In one embodiment, the first procedure comprises: dropping configuration related to sidelink communications for a given node, and the given node comprises a destination node or a relay node.

In one embodiment, the first procedure comprises: resetting a sidelink specific MAC of a given node, the given node comprises a destination node or a relay node.

In one embodiment, the first procedure comprises: assuming that a PC5-RRC connection for a given node is released, and the given node comprises a destination node or a relay node.

In one embodiment, the first procedure comprises: re-transmitting the second message.

In one embodiment, the first procedure comprises: re-transmitting a AMD PDU, and a P field of the AMD PDU is set to "1".

In one embodiment, the first procedure comprises: re-transmitting a DIRECT_COMMUNICATION_KEEPALIVE message.

In one embodiment, the first procedure comprises: re-transmitting a Keep-alive message.

In one embodiment, the first procedure comprises: updating a first counter.

In one subembodiment of the embodiment, the first counter comprises the first counter being added 1.

In one subembodiment of the embodiment, the first counter comprises the first counter being subtracted 1.

In one subembodiment of the embodiment, the first counter comprises RETX_COUNT.

In one subembodiment of the above embodiment, the first counter comprises a keepalive counter.

In one subembodiment of the above embodiment, the first counter is used to determine a number of times that the second-type message is transmitted.

In one subembodiment of the above embodiment, a number of times that the second-type message is transmitted comprises a number of times that the second-type message is re-transmitted.

In one subembodiment of the above embodiment, the second-type message comprises the second message.

In one subembodiment of the above embodiment, the second-type message is different from another the second-type message.

In one subembodiment of the above embodiment, the second-type message is the same as another the second-type message.

In one subembodiment of the above embodiment, when the first counter reaches a first threshold, an occurrence of a given radio link failure is determined.

In one subsidiary embodiment of the subembodiment, the first threshold comprises a maximum value of a number of retransmissions of Keep-alive message.

In one subsidiary embodiment of the subembodiment, the first threshold comprises a maximum value of retransmissions of a DIRECT_COMMUNICATION_KEEPALIVE message.

In one subsidiary embodiment of the subembodiment, the first threshold comprises maxRetxThreshold.

In one subsidiary embodiment of the subembodiment, the first threshold comprises a maximum number of times of continuous HARQ DTXs.

In one subembodiment of the above embodiment, when the first counter reaches a first threshold, a link between a source node and a destination node is released.

In one subembodiment of the above embodiment, when the first counter reaches a second threshold, performing a relay reselection is determined.

In one subsidiary embodiment of the above embodiment, the second threshold is not greater than the first threshold.

In one subsidiary embodiment of the above embodiment, the second threshold is less than the first threshold.

In one subsidiary embodiment of the above subembodiment, the second threshold is configurable.

In one subsidiary embodiment of the above subembodiment, the second threshold is configured through an RRC signaling.

In one subsidiary embodiment of the above subembodiment, the second threshold is a positive integer.

In one subsidiary embodiment of the above subembodiment, the action of determining an execution of relay retransmission comprises: re-selecting a relay.

In one subsidiary embodiment of the above subembodiment, the action of determining an execution of relay retransmission comprises: selecting another node, and establishing a connection between a source node and a destination node.

In one subsidiary embodiment of the above subembodiment, the action of determining an execution of relay retransmission comprises: associating an RLC channel of a relay node with another node.

In one embodiment, the first procedure comprises: transmitting a fourth message, the fourth message being the same as part of the second message.

In one embodiment, the first procedure comprises: transmitting a fourth message, the fourth message being the same as all of the second message.

In one embodiment, the first procedure comprises: starting a second timer.

In one subembodiment of the embodiment, the second timer is the same as the first timer.

In one subembodiment of the embodiment, the second timer is different from the first timer.

In one subembodiment of the above embodiment, the second timer comprises T4102.

In one embodiment, the first procedure comprises: Relay Reselection.

In one embodiment, the first procedure comprises: indicating a PC5-RRC connection release (PC5 is unavailable) for a given node to a higher layer, the given node comprises a destination node or a relay node.

In one embodiment, the first procedure comprises: if a UE is in connected state, performing a sidelink UE information procedure of sidelink communications.

In one subembodiment of the embodiment, the sidelink UE information procedure comprises setting contents in a given message, and transmitting the given message.

In one subsidiary embodiment of the subembodiment, the given message comprises a SidelinkUEInformationNR message or a SidelinkUEInformation message.

In one subsidiary embodiment of the above subembodiment, a receiver of the given message comprises a base station.

In one subsidiary embodiment of the above subembodiment, the given message comprises a field, the field indicates a destination identity of the destination node, and the field comprises an sl-DestinationIdentity.

In one subsidiary embodiment of the above subembodiment, the given message comprises a field, the field indicates a given radio link failure, and the field comprises sl-Failure.

In one subsidiary embodiment of the above subembodiment, the field is set as rlf or configFailure.

In one subsidiary embodiment of the above subembodiment, the field is related to relay failure.

In one subsidiary embodiment of the above subembodiment, the field is set as relay ReselectionFailure.

In one subsidiary embodiment of the above subembodiment, the given message comprises a field, and the field indicates whether there exists a relay between a source node and a destination node.

In one subsidiary embodiment of the above subembodiment, the given message comprises a field, and the field indicates a number of relays between a source node and a destination node.

In one subsidiary embodiment of the above subembodiment, the given message comprises a field, and the field indicates an ARQ between a source node and a destination node is end-to-end or hop-by-hop.

In one subembodiment of the embodiment, the sidelink UE information procedure comprises transmitting a ULInformationTransferIRAT message, and the ULInformationTransferIRAT message comprises the given message.

In one embodiment, the phrase that a third message is triggered by the second message comprises: the third message is a response to the second message.

In one embodiment, the phrase that a third message is triggered by the second message comprises: the second message triggers the third message.

In one embodiment, the phrase that a third message is triggered by the second message comprises: the third message is a confirmation message to the second message.

In one embodiment, the phrase that a third message is triggered by the second message comprises: transmitting the second message is used to determine receiving the third message.

In one embodiment, the third message is transmitted via an air interface.

In one embodiment, the third message is transmitted through an antenna port.

In one embodiment, the third message is transmitted through a high-layer signaling.

In one embodiment, the third message is transmitted through a higher-layer signaling.

In one embodiment, the third message comprises a DL signal.

In one embodiment, the third message comprises a sidelink signal.

In one embodiment, the third message comprises all or part of a high-layer signaling.

In one embodiment, the third message comprises all or part of a higher-layer signaling.

In one embodiment, the second message comprises a Layer 3 (L3) message.

In one embodiment, the second message comprises a standard L3 message.

In one embodiment, the third message comprises an RRC message.

In one embodiment, the third message comprises one or multiple IEs in an RRC message.

In one embodiment, the third message comprises one or multiple fields in an RRC message.

In one embodiment, the third message comprises a MAC-layer message.

In one embodiment, the third message comprises a physical-layer message.

In one embodiment, the third message comprises an RLC data PDU.

In one embodiment, the third message comprises an RLC control PDU.

In one embodiment, the third message comprises a STATUS PDU.

In one embodiment, the third message comprises a NAS message.

In one embodiment, the third message comprises a PC5 Signaling message.

In one embodiment, the third message comprises an RRCSetup message.

In one embodiment, the third message comprises an RRCReject message.

In one embodiment, the third message comprises an RRCReestablishment message.

In one embodiment, the third message comprises an RRCReconfiguration with reconfigurationWithSync message.

In one embodiment, the third message comprises an RRCRelease message.

In one embodiment, the third message comprises a MobilityFromNRCommand message.

In one embodiment, the third message comprises an RRCResume message.

In one embodiment, the third message comprises an RRCConnectionSetup.

In one embodiment, the third message comprises an RRCConnectionReject.

In one embodiment, the third message comprises an RRCConnectionResume.

In one embodiment, the third message comprises an RRCEarlyDataComplete.

In one embodiment, the third message comprises RRCConnectionRelease for UP-EDT.

In one embodiment, the third message comprises a RRCConnectionReestablishment.

In one embodiment, the third message comprises a RRCConnectionReestablishmentReject.

In one embodiment, the third message comprises an RRCConnectionRelease.

In one embodiment, the third message comprises a MobilityFromEUTRACommand.

In one embodiment, the third message comprises an RRCConnectionReconfiguration comprising mobilityControlInfo.

In one embodiment, the third message comprises a delayBudgetReportingConfig, and delayBudgetReportingConfig is set as release.

In one embodiment, the third message comprises drx-PreferenceConfig, and drx-PreferenceConfig is set as release.

In one embodiment, the third message comprises maxBW-PreferenceConfig, and maxBW-PreferenceConfig is set as release.

In one embodiment, the third message comprises maxCC-PreferenceConfig, and maxCC-PreferenceConfig is set as release.

In one embodiment, the third message comprises maxMIMO-LayerPreferenceConfig, and maxMIMO-LayerPreferenceConfig is set as release.

In one embodiment, the third message comprises minSchedulingOffsetPreferenceConfig, and minSchedulingOffsetPreferenceConfig is set as release.

In one embodiment, the third message comprises releasePreferenceConfig, and releasePreferenceConfig is set as release.

In one embodiment, the third message comprises onDemandSIB-Request, and onDemandSIB-Request is set as release.

In one embodiment, the third message comprises an RRCReconfigurationFailureSidelink message.

In one embodiment, the third message comprises an RRCReconfigurationCompleteSidelink message.

In one embodiment, the third message comprises a STATUS report.

In one embodiment, the third message comprises a DIRECT_COMMUNICATION_KEEPALIVE_ACK message.

In one embodiment, the third message comprises a Keepalive message.

In one embodiment, the third message comprises user data from a given node, and the given node comprises the second node in the present application or the third node in the present application.

In one embodiment, the third message comprises user data from a given node, and the given node comprises a peer UE.

In one embodiment, the phrase that the second moment is after the first moment and its interval with the first moment is a second time length comprises: the second moment is greater than the first moment, and an absolute value of a difference value between the second moment and the first moment is equal to the second time length.

In one embodiment, the phrase that the second moment is after the first moment and its interval with the first moment is a second time length comprises: a difference value obtained by subtracting the first moment from the second moment is equal to the second time length.

In one embodiment, the phrase that the second moment is after the first moment and its interval with the first moment is a second time length comprises: the second moment refers to a moment determined by a time interval from the first moment passing through the second time length.

In one embodiment, the phrase that the second moment is after the first moment and its interval with the first moment is a second time length comprises: a time interval between the second moment and the first moment is the second time length.

In one embodiment, the phrase that the first time length is used to determine the second time length comprises: the second time length is related to the first time length.

In one embodiment, the phrase that the first time length is used to determine the second time length comprises: the second time length is not less than the first time length.

In one subembodiment of the above embodiment, the second time length is equal to the first time length.

In one subembodiment of the above embodiment, the second time length is greater than the first time length.

In one embodiment, the phrase that the first time length is used to determine the second time length comprises: the second time length comprises the first time length.

In one embodiment, the phrase that the first time length is used to determine the second time length comprises: a sum of the first time length and a given offset is equal to the second time length.

In one embodiment, the given offset comprises the first offset in the present application.

In one embodiment, the given offset comprises a pre-configured value.

In one embodiment, the given offset comprises a time interval.

In one embodiment, the given offset is equal to 0.

In one embodiment, the given offset is greater than 0.

In one embodiment, the given offset comprises at least one ms.

In one embodiment, the given offset comprises at least one slot.

In one embodiment, the phrase that the first time length is used to determine the second time length comprises: the first time length is a part in the second time length.

In one embodiment, the phrase that the first time length is used to determine the second time length comprises: the second time length is equal to the first time length.

In one embodiment, the second time length comprises a positive integer number of ms(s).

In one embodiment, the second time length comprises at least one slot, the slot comprises at least one of slot, or radio subframe, or Radio Frame, or multiple Orthogonal Frequency Division Multiplexing (OFDM) symbols, or multiple Single Carrier Frequency Division Multiple Access (SC-FDMA) symbols.

In one embodiment, the phrase that the second time length is related to whether the second message is relayed comprises: the second time length is related to N1, N1 is used to indicate a number of times that the second message is relayed, N1 being a non-negative integer.

In one subembodiment of the embodiment, a number of times that the second message is relayed is related to a number of hoppings between a source node and a destination node.

In one subembodiment of the embodiment, when N1 is equal to 0, the source node and the destination node is not through relay.

In one subembodiment of the embodiment, when N1 is greater than 0, the source node and the destination node is through relay.

In one subembodiment of the above embodiment, the greater N1 is, the longer the second time length is.

In one subembodiment of the above embodiment, the small N1 is, the shorter the second time length is.

In one subembodiment of the above embodiment, the second time length is proportional to the (N1+1).

In one subembodiment of the above embodiment, the second time length is equal to a product of (N1+1) and the first time length.

In one subembodiment of the embodiment, when N1 is greater than 0, (a difference between the second time length and the first time length) is proportional to N1.

In one subsidiary embodiment of the above embodiment, (a difference value between the second time length and the first time length) is equal to (a product of N1 and a given offset).

In one subembodiment of the above embodiment, when N1 is equal to 0, the second time length is equal to the first time length.

In one embodiment, the phrase that the second time length is related to whether the second message is relayed comprises: when a second time length corresponding to when the second message is relayed is greater than another second time length corresponding to when the second message is not relayed.

In one embodiment, the phrase that the second time length is related to whether the second message is relayed comprises: whether the second time length is equal to the first time length is related to whether the second message is relayed.

In one subembodiment of the above embodiment, when the second message is relayed, the second time length is not equal to the first time length.

In one subsidiary embodiment of the above embodiment, the second time length is equal to a sum of the first time length and the given offset.

In one subembodiment of the above embodiment, when the second message is not relayed, the second time length is equal to the first time length.

In one subsidiary embodiment of the above embodiment, the second message is relayed refers to that the second message reaches a destination node through a relay node.

In one subembodiment of the above embodiment, the second message is transmitted to the relay node, and the relay node transmits the second message to the destination node.

In one subembodiment of the above embodiment, the second message is delivered to lower layer corresponding to the first radio signal at the lower layer, a destination address carried by the first radio signal comprises a relay node, the relay node receives the first radio signal, a transmitting end of the relay node corresponds to the second radio signal, and a destination address carried by the second radio signal comprises a destination node.

In one embodiment, when the second message is received before the second moment arrives, the first procedure is not executed.

In one embodiment, as a response to receiving the second message from the first moment to the second moment, performing the first procedure is dropped.

In one embodiment, the moment in the present application comprises a specific moment.

In one embodiment, the moment mentioned in the present application is for convenience in description and does not represent a specific moment, but rather a moment when an action is triggered.

In one embodiment, the moment in the present application does not take into account the delay caused by software or hardware processing.

In one embodiment, the moment in the present application is associated with a triggering moment of a certain action.

In one embodiment, the source node in the present application comprises the first node in the present application.

In one embodiment, the relay node comprises the second node in the present application.

In one embodiment, the destination node in the present application comprises the third node in the present application.

In one embodiment, the relay node refers to a forwarding node.

In one embodiment, the relay node refers to an L3 relay.

In one embodiment, the relay node refers to an L2 relay.

In one embodiment, the relay node comprises a UE.

In one embodiment, the relay node comprises a base station.

In one embodiment, the source node comprises a UE.

In one embodiment, the source node comprises a base station.

In one embodiment, the destination node comprises a UE.

In one embodiment, the destination node comprises a base station.

In one embodiment, the relay node comprises a UE.

In one embodiment, the relay node comprises a base station.

Embodiment 2

Figure 2:
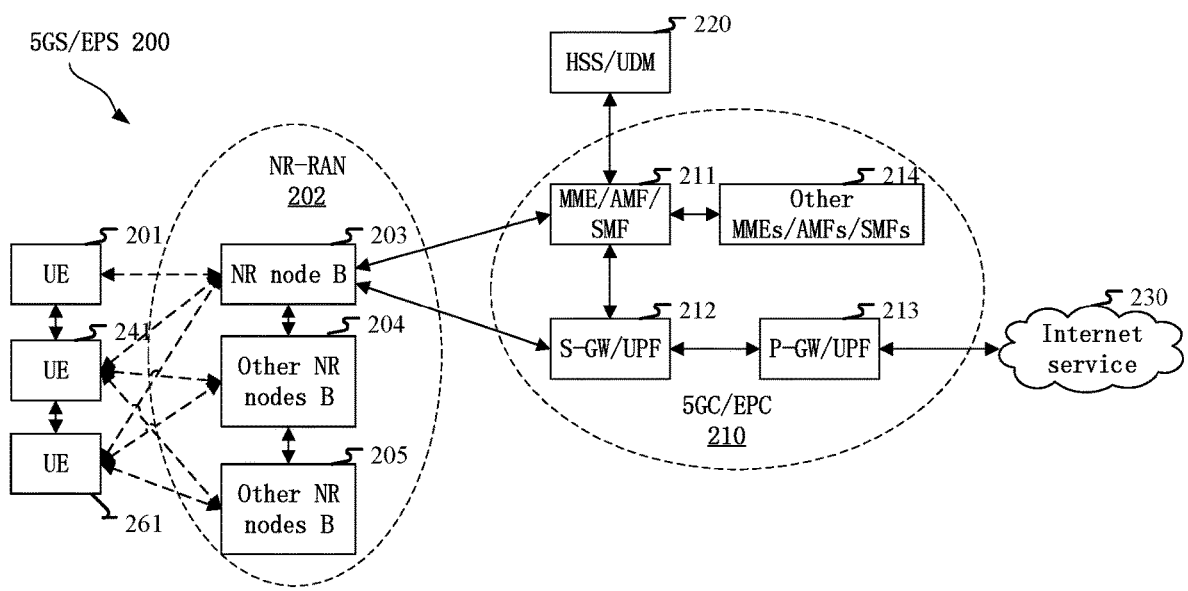
FIG. 2 illustrates a schematic diagram of a network architecture according to one embodiment of the present application.

Embodiment 2 illustrates a schematic diagram of a network architecture according to one embodiment of the present application, as shown in FIG. 2. FIG. 2 is a diagram illustrating a network architecture 200 of 5G NR, Long-Term Evolution (LTE) and Long-Term Evolution Advanced (LTE-A) systems. The 5G NR or LTE network architecture 200 may be called a 5G System (5GS)/Evolved Packet System (EPS) 200 or other appropriate terms. The 5GS/EPS 200 may comprise one or more UEs 201/UE241/UE261, an NG-RAN 202, a 5G Core Network/Evolved Packet Core (5GC/EPC) 210, a Home Subscriber Server (HSS)/Unified Data Management (UDM) 220 and an Internet Service 230. The 5GS/EPS 200 may be interconnected with other access networks. For simple description, the entities/interfaces are not shown. As shown in FIG. 2, the 5GS/EPS 200 provides packet switching services. Those skilled in the art will readily understand that various concepts presented throughout the present application can be extended to networks providing circuit switching services or other cellular networks. The NG-RAN 202 comprises an NR node B (gNB) 203 and other gNBs 204/gNB 205. The gNB203/gNB204/gNB205 provides user and control plane protocol terminations towards the UE201/UE241/UE261. The gNB 203 may be connected to other gNBs 204 via an Xn interface (for example, backhaul). The gNB 204 may be connected to other gNBs 205 via an Xn interface (for example, backhaul). The gNB203/gNB204/gNB205 may be called a base station, a base transceiver station, a radio base station, a radio transceiver, a transceiver function, a Base Service Set (BSS), an Extended Service Set (ESS), a Transmitter Receiver Point (TRP) or some other applicable terms. The gNB 203/gNB 204/gNB 205 provides an access point of the 5GC/EPC 210 for the UE 201/UE 241/UE 261. Examples of the UE 201/UE 241/UE 261 include cellular phones, smart phones, Session Initiation Protocol (SIP) phones, laptop computers, Personal Digital Assistant (PDA), satellite Radios, non-terrestrial base station communications, Satellite Mobile Communications, Global Positioning Systems (GPSs), multimedia devices, video devices, digital audio players (for example, MP3 players), cameras, game consoles, unmanned aerial vehicles (UAV), aircrafts, narrow-band Internet of Things (IoT) devices, machine-type communication devices, land vehicles, automobiles, wearable devices, or any other similar functional devices. Those skilled in the art also can call the UE 201UE 241/UE 261 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client or some other appropriate terms. The gNB 203/gNB 204/gNB 205 is connected to the 5GC/EPC 210 via an S1/NG interface. The 5GC/EPC 210 comprises a Mobility Management Entity (MME)/Authentication Management Field (AMF)/Session Management Function (SMF) 211, other MMEs/AMFs/SMFs 214, a Service Gateway (S-GW)/User Plane Function (UPF) 212 and a Packet Date Network Gateway (P-GW)/UPF 213. The MME/AMF/SMF 211 is a control node for processing a signaling between the UE 201/UE 241/UE 261 and the 5GC/EPC 210. Generally, the MME/AMF/SMF 211 provides bearer and connection management. All user Internet Protocol (IP) packets are transmitted through the S-GW/UPF 212, the S-GW/UPF 212 is connected to the P-GW/UPF 213. The P-GW provides UE IP address allocation and other functions. The P-GW/UPF 213 is connected to the Internet Service 230. The Internet Service 230 comprises IP services corresponding to operators, specifically including Internet, Intranet, IP Multimedia Subsystem (IMS) and Packet Switching Streaming Services (PSS).

In one embodiment, the UE 201 corresponds to the first node in the present application.

In one embodiment, the UE 201 is a UE.

In one embodiment, the UE 241 corresponds to the second node in the present application.

In one embodiment, the UE 241 is a relay.

In one embodiment, the UE 241 is a UE.

In one embodiment, the UE 261 corresponds to the third node in the present application.

In one embodiment, the UE 261 is a UE.

In one embodiment, the UE 261 is a relay.

In one embodiment, the gNB 203 corresponds to the first node in the present application.

In one embodiment, the gNB 203 corresponds to the second node in the present application.

In one embodiment, the gNB 203 corresponds to the fourth node in the present application.

In one embodiment, the gNB 203 is a BaseStation (BS).

In one embodiment, the gNB 203 is a UE.

In one embodiment, the gNB 203 is a relay.

In one embodiment, the gNB 203 is a gateway.

In one embodiment, the gNB 204 corresponds to the second node in the present application.

In one embodiment, the gNB 204 corresponds to the third node in the present application.

In one embodiment, the gNB 204 corresponds to the fourth node in the present application.

In one embodiment, the gNB 204 is a base station.

In one embodiment, the gNB 204 is a UE.

In one embodiment, the gNB 204 is a relay.

In one embodiment, the gNB 204 is a gateway.

In one embodiment, the gNB 205 corresponds to the third node in the present application.

In one embodiment, the gNB 205 is a base station.

In one embodiment, the gNB 205 is a UE.

In one embodiment, the gNB 205 is a relay.

In one embodiment, the gNB 205 is a gateway.

In one embodiment, the UE 201 corresponds to the first node in the present application, the UE 241 corresponds to the second node in the present application, and the UE 261 corresponds to the third node in the present application.

In one embodiment, the UE 201 corresponds to the first node in the present application, the UE 241 corresponds to the second node in the present application, and the gNB 204 corresponds to the third node in the present application.

In one embodiment, the UE 201 corresponds to the first node in the present application, the gNB 203 corresponds to the second node in the present application, and the gNB 204 corresponds to the third node in the present application.

In one embodiment, the gNB 203 corresponds to the first node in the present application, the gNB 204 corresponds to the second node in the present application, and the gNB 205 corresponds to the third node in the present application.

In one embodiment, the UE supports Terrestrial Network (NTN) transmission.

In one embodiment, the UE supports Non-Terrestrial Network (NTN) transmission.

In one embodiment, the UE supports communications within networks with large latency differences.

In one embodiment, the UE supports Dual Connection (DC) transmission.

In one embodiment, the UE comprises an aircraft.

In one embodiment, the UE comprises a vehicle terminal.

In one embodiment, the UE comprises a vessel.

In one embodiment, the UE comprises an Internet of Things (IoT) terminal.

In one embodiment, the UE comprises an industrial Internet of Things (IoT) terminal.

In one embodiment, the UE comprises a device supporting transmission with low-latency and high-reliability.

In one embodiment, the UE comprises a test equipment.

In one embodiment, the UE comprises a signaling tester.

In one embodiment, the base station supports transmission over a non-terrestrial network.

In one embodiment, the base station supports transmission over networks with large latency differences.

In one embodiment, the base station supports transmission over a terrestrial network.

In one embodiment, the base station comprises a Marco Cellular base station.

In one embodiment, the base station comprises a Micro Cell base station.

In one embodiment, the base station comprises a Pico Cell base station.

In one embodiment, the base station comprises a Femtocell.

In one embodiment, the base station comprises a base station supporting large latency differences.

In one embodiment, the base station comprises flight platform equipment.

In one embodiment, the base station comprises satellite equipment.

In one embodiment, the base station comprises a Transmitter Receiver Point (TRP).

In one embodiment, the base station comprises a Centralized Unit (CU).

In one embodiment, the base station comprises a Distributed Unit (DU).

In one embodiment, the base station comprises test equipment.

In one embodiment, the base station comprises a signaling tester.

In one embodiment, the base station comprises an Integrated Access and Backhaul (IAB)-node.

In one embodiment, the base station comprises an IAB-donor.

In one embodiment, the base station comprises an IAB-donor-CU.

In one embodiment, the base station comprises an IAB-donor-DU.

In one embodiment, the base station comprises an IAB-DU.

In one embodiment, the base station comprises an IAB-MT.

In one embodiment, the relay comprises a relay.

In one embodiment, the relay comprises an L3 relay.

In one embodiment, the relay comprises an L2 relay.

In one embodiment, the relay comprises a router.

In one embodiment, the relay comprises a switcher.

In one embodiment, the relay comprises a UE.

In one embodiment, the relay comprises a base station.

In one embodiment, the dashed bidirectional arrows in FIG. 2 are optional.

In one embodiment, one or multiple of the dashed bidirectional arrows in FIG. 2 exit.

In one embodiment, none of the dashed bidirectional arrows in FIG. 2 exists.

Embodiment 3

Figure 3:
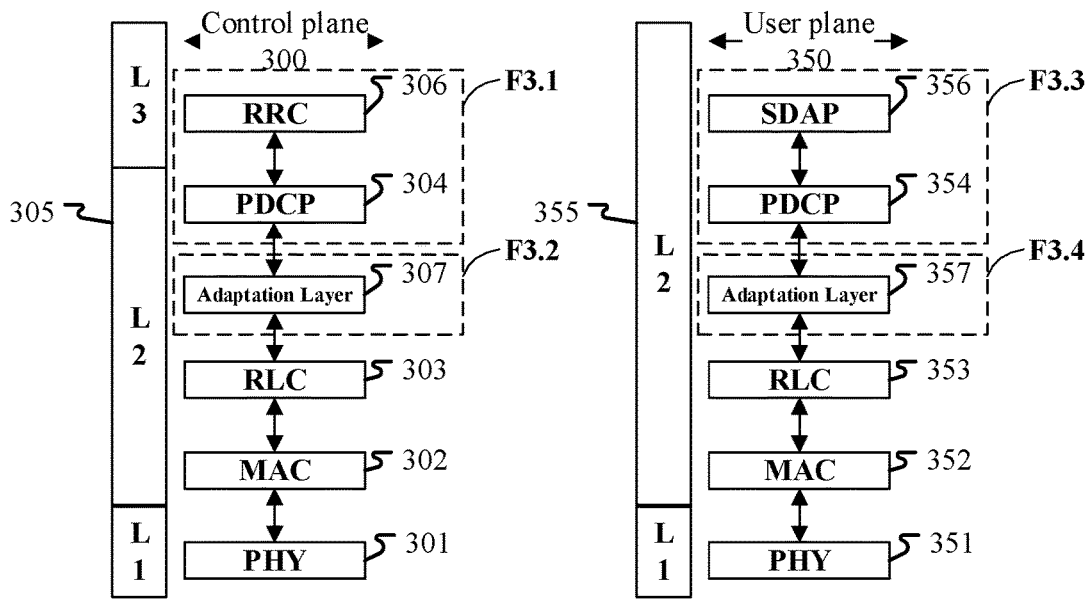
FIG. 3 illustrates a schematic diagram of a radio protocol architecture of a user plane and a control plane according to one embodiment of the present application.

Embodiment 3 illustrates a schematic diagram of an example of a radio protocol architecture of a user plane and a control plane according to one embodiment of the present application, as shown in FIG. 3. FIG. 3 is a schematic diagram illustrating an embodiment of a radio protocol architecture of a user plane 350 and a control plane 300. In FIG. 3, the radio protocol architecture for the control plane 300 is represented by three layers, which are a layer 1, a layer 2 and a layer 3, respectively. The layer 1 (L1) is the lowest layer and performs signal processing functions of various PHY layers. The L1 is called PHY 301 in the present application. L2 305, above the PHY 301, comprises a Medium Access Control (MAC) sublayer 302, a Radio Link Control (RLC) sublayer 303 and a Packet Data Convergence Protocol (PDCP) sublayer 304. The PDCP sublayer 304 provides multiplexing among variable radio bearers and logical channels. The PDCP sublayer 304 provides security by encrypting a data packet and provides support for handover. The RLC sublayer 303 provides segmentation and reassembling of a higher-layer packet, retransmission of a lost packet, and reordering of a data packet so as to compensate the disordered receiving caused by HARQ. The MAC sublayer 302 provides multiplexing between a logical channel and a transport channel. The MAC sublayer 302 is also responsible for allocating various radio resources (i.e., resources block) in a cell. The MAC sublayer 302 is also in charge of HARQ operation. The RRC sublayer 306 in L3 layer of the control plane 300 is responsible for acquiring radio resources (i.e., radio bearer) and configuring the lower layer with an RRC signaling. The radio protocol architecture of the user plane 350 comprises layer 1 (L1) and layer 2 (L2). In the user plane 350, the radio protocol architecture is almost the same as the corresponding layer and sublayer in the control plane 300 for physical layer 351, PDCP sublayer 354, RLC sublayer 353 and MAC sublayer 352 in L2 layer 355, but the PDCP sublayer 354 also provides a header compression for a higher-layer packet so as to reduce a radio transmission overhead. The L2 layer 355 in the user plane 350 also includes Service Data Adaptation Protocol (SDAP) sublayer 356, which is responsible for the mapping between QoS flow and Data Radio Bearer (DRB) to support the diversity of traffic.

In one embodiment, the dotted box F3.1 is optional.

In one embodiment, the dotted box F3.2 is optional.

In one embodiment, the dotted box F3.3 is optional.

In one embodiment, the dotted box F3.4 is optional.

In one embodiment, the dotted box F3.1 exist, and the dotted box F3.2 does not exist.

In one embodiment, the dotted box F3.1 does not exist, and the dotted box F3.2 exists.

In one embodiment, the dotted box F3.3 exist, and the dotted box F3.4 does not exist.

In one embodiment, the dotted box F3.3 does not exist, and the dotted box F3.4 exists.

In one embodiment, the radio protocol architecture in FIG. 3 is applicable to the first node in the present application.

In one subembodiment of the embodiment, the dotted box F3.1 exists, and the dotted box F3.2 does not exist.

In one subembodiment of the embodiment, the dotted box F3.3 exists, and the dotted box F3.4 does not exist.

In one subembodiment of the embodiment, the dotted box F3.1 exists, and the dotted box F3.2 exists.

In one subembodiment of the embodiment, the dotted box F3.3 exists, and the dotted box F3.4 exists.

In one embodiment, the radio protocol architecture in FIG. 3 is applicable to the second node in the present application.

In one subembodiment of the embodiment, the dotted box F3.1 does not exist, and the dotted box F3.2 exists.

In one subembodiment of the embodiment, the dotted box F3.3 does not exist, and the dotted box F3.4 exists.

In one subembodiment of the embodiment, the RLC sublayer 303 and RLC sublayer 353 do not exist.

In one subembodiment of the embodiment, the MAC sublayer 302 and the MAC sublayer 352 do not exist.

In one embodiment, the radio protocol architecture in FIG. 3 is applicable to the third node in the present application.

In one subembodiment of the embodiment, the dotted box F3.1 exists, and the dotted box F3.2 does not exist.

In one subembodiment of the embodiment, the dotted box F3.3 exists, and the dotted box F3.4 does not exist.

In one subembodiment of the embodiment, the dotted box F3.1 exists, and the dotted box F3.2 exists.

In one embodiment, the dotted box F3.1 exists, and the dotted box F3.4 exists.

In one embodiment, the radio protocol architecture in FIG. 3 is applicable to the fourth node in the present application.

In one subembodiment of the embodiment, the dotted box F3.1 exists, and the dotted box F3.2 does not exist.

In one subembodiment of the embodiment, the dotted box F3.3 exists, and the dotted box F3.4 does not exist.

In one embodiment, the adaptation layer comprises Sidelink Application Protocol (SLAP) sublayer.

In one embodiment, the adaptation layer comprises Backhaul Application Protocol (BAP) sublayer.

In one embodiment, the adaptation layer implements bearer mapping function.

In one embodiment, the bearer mapping function maps an RLC bearer of the first node in the present application to an RLC bearer of the third node in the present application; herein, an RLC bearer of the first node corresponds to a first RLC channel, and the first RLC channel belongs to the first RLC channel set; an RLC bearer of the second node corresponds to a second RLC channel, the second RLC channel belongs to the second RLC channel set.

In one embodiment, the first signaling in the present application is generated by the RRC 306.

In one embodiment, the first signaling in the present application is generated by the MAC 302 or the MAC 352.

In one embodiment, the second signaling in the present application is generated by the RRC 306.

In one embodiment, the second signaling in the present application is generated by the MAC 302 or the MAC 352.

In one embodiment, the second message in the present application is generated by the RRC 306.

In one embodiment, the second message in the present application is generated by the MAC 302 or the MAC 352.

In one embodiment, the first radio signal in the present application is generated by the RLC 303 or the RLC 353.

In one embodiment, the first radio signal in the present application is generated by the MAC 302 or the MAC 352.

In one embodiment, the first radio signal in the present application is generated by the PHY 301 or the PHY 351.

In one embodiment, the second radio signal in the present application is generated by the adaptation layer 307 or the adaptation layer 357.

In one embodiment, the second radio signal in the present application is generated by the RLC 303 or the RLC 353.

In one embodiment, the second radio signal in the present application is generated by the MAC 302 or the MAC 352.

In one embodiment, the second radio signal in the present application is generated by the PHY 301 or the PHY 351.

In one embodiment, the third message in the present application is generated by the RRC 306.

In one embodiment, the third message in the present application is generated by the MAC 302 or the MAC 352.

In one embodiment, the first feedback in the present application is generated by the adaptation layer 307 or the adaptation layer 357.

In one embodiment, the first feedback in the present application is generated by the RLC 303 or the RLC 353.

In one embodiment, the first feedback in the present application is generated by the MAC 302 or the MAC 352.

In one embodiment, the first feedback in the present application is generated by the PHY 301 or the PHY 351.

Embodiment 4

Figure 4:
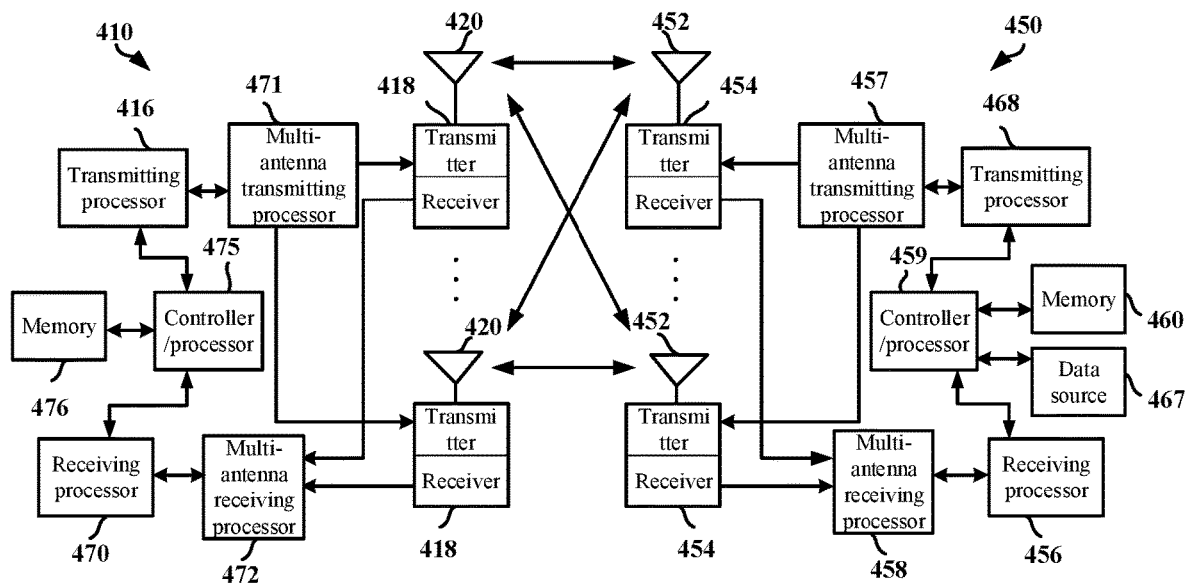
FIG. 4 illustrates a schematic diagram of a first communication device and a second communication device according to one embodiment of the present application.

Embodiment 4 illustrates a schematic diagram of a first communication device and a second communication device in the present application, as shown in FIG. 4. FIG. 4 is a block diagram of a first communication device 450 in communication with a second communication device 410 in an access network.

The first communication device 450 comprises a controller/processor 459, a memory 460, a data source 467, a transmitting processor 468, a receiving processor 456, a multi-antenna transmitting processor 457, a multi-antenna receiving processor 458, a transmitter/receiver 454 and an antenna 452.

The second communication device 410 comprises a controller/processor 475, a memory 476, a receiving processor 470, a transmitting processor 416, a multi-antenna receiving processor 472, a multi-antenna transmitting processor 471, a transmitter/receiver 418 and an antenna 420.

In a transmission from the second communication device 410 to the first communication device 450, at the first communication device 410, a higher layer packet from the core network is provided to a controller/processor 475. The controller/processor 475 provides a function of the L2 layer. In the transmission from the second communication device 410 to the first communication device 450, the controller/processor 475 provides header compression, encryption, packet segmentation and reordering, and multiplexing between a logical channel and a transport channel, and radio resources allocation for the first communication device 450 based on various priorities. The controller/processor 475 is also responsible for retransmission of a lost packet and a signaling to the first communication device 450. The transmitting processor 416 and the multi-antenna transmitting processor 471 perform various signal processing functions used for the L1 layer (that is, PHY). The transmitting processor 416 performs coding and interleaving so as to ensure an FEC (Forward Error Correction) at the second communication device 410 side, and the mapping to signal clusters corresponding to each modulation scheme (i.e., BPSK, QPSK, M-PSK, M-QAM, etc.). The multi-antenna transmitting processor 471 performs digital spatial precoding, including codebook-based precoding and non-codebook-based precoding, and beamforming on encoded and modulated symbols to generate one or more spatial streams. The transmitting processor 416 then maps each spatial stream into a subcarrier. The mapped symbols are multiplexed with a reference signal (i.e., pilot frequency) in time domain and/or frequency domain, and then they are assembled through Inverse Fast Fourier Transform (IFFT) to generate a physical channel carrying time-domain multi-carrier symbol streams. After that the multi-antenna transmitting processor 471 performs transmission analog precoding/beamforming on the time-domain multi-carrier symbol streams. Each transmitter 418 converts a baseband multi-carrier symbol stream provided by the multi-antenna transmitting processor 471 into a radio frequency (RF) stream. Each radio frequency stream is later provided to different antennas 420.

In a transmission from the second communication device 410 to the first communication device 450, at the second communication device 450, each receiver 454 receives a signal via a corresponding antenna 452. Each receiver 454 recovers information modulated to the RF carrier, converts the radio frequency stream into a baseband multicarrier symbol stream to be provided to the receiving processor 456. The receiving processor 456 and the multi-antenna receiving processor 458 perform signal processing functions of the L1 layer. The multi-antenna receiving processor 458 performs receiving analog precoding/beamforming on a baseband multicarrier symbol stream from the receiver 454. The receiving processor 456 converts the baseband multicarrier symbol stream after receiving the analog precoding/beamforming from time domain into frequency domain using FFT. In frequency domain, a physical layer data signal and a reference signal are de-multiplexed by the receiving processor 456, wherein the reference signal is used for channel estimation, while the data signal is subjected to multi-antenna detection in the multi-antenna receiving processor 458 to recover any the first communication device-targeted spatial stream. Symbols on each spatial stream are demodulated and recovered in the receiving processor 456 to generate a soft decision. Then the receiving processor 456 decodes and de-interleaves the soft decision to recover the higher-layer data and control signal transmitted on the physical channel by the second communication node 410. Next, the higher-layer data and control signal are provided to the controller/processor 459. The controller/processor 459 performs functions of the L2 layer. The controller/processor 459 can be connected to a memory 460 that stores program code and data. The memory 460 can be called a computer readable medium. In the transmission from the second communication device 410 to the second communication device 450, the controller/processor 459 provides demultiplexing between a transport channel and a logical channel, packet reassembling, decryption, header decompression and control signal processing so as to recover a higher-layer packet from the core network. The higher-layer packet is later provided to all protocol layers above the L2 layer, or various control signals can be provided to the L3 layer for processing.

In a transmission from the first communication device 450 to the second communication device 410, at the second communication device 450, the data source 467 is configured to provide a higher-layer packet to the controller/processor 459. The data source 467 represents all protocol layers above the L2 layer. Similar to a transmitting function of the second communication device 410 described in the transmission from the second communication device 410 to the first communication device 450, the controller/processor 459 performs header compression, encryption, packet segmentation and reordering, and multiplexing between a logical channel and a transport channel based on radio resources allocation so as to provide the L2 layer functions used for the user plane and the control plane. The controller/processor 459 is also responsible for retransmission of a lost packet, and a signaling to the second communication device 410. The transmitting processor 468 performs modulation mapping and channel coding. The multi-antenna transmitting processor 457 implements digital multi-antenna spatial precoding, including codebook-based precoding and non-codebook-based precoding, as well as beamforming. Following that, the generated spatial streams are modulated into multicarrier/single-carrier symbol streams by the transmitting processor 468, and then modulated symbol streams are subjected to analog precoding/beamforming in the multi-antenna transmitting processor 457 and provided from the transmitters 454 to each antenna 452. Each transmitter 454 first converts a baseband symbol stream provided by the multi-antenna transmitting processor 457 into a radio frequency symbol stream, and then provides the radio frequency symbol stream to the antenna 452.

In the transmission from the first communication device 450 to the second communication device 410, the function at the second communication device 410 is similar to the receiving function at the first communication device 450 described in the transmission from the second communication device 410 to the first communication device 450. Each receiver 418 receives a radio frequency signal via a corresponding antenna 420, converts the received radio frequency signal into a baseband signal, and provides the baseband signal to the multi-antenna receiving processor 472 and the receiving processor 470. The receiving processor 470 and multi-antenna receiving processor 472 collectively provide functions of the L1 layer. The controller/processor 475 provides functions of the L2 layer. The controller/processor 475 can be connected with the memory 476 that stores program code and data. The memory 476 can be called a computer readable medium. In the transmission from the first communication device 450 to the second communication device 410, the controller/processor 475 provides de-multiplexing between a transport channel and a logical channel, packet reassembling, decryption, header decompression, control signal processing so as to recover a higher-layer packet from the UE 450. The higher-layer packet coming from the controller/processor 475 may be provided to the core network.

In one embodiment, the first communication device 450 corresponds to the first node in the present application, and the second communication device 410 corresponds to the second node in the present application.

In one subembodiment of the above embodiment, the first communication device 450 comprises: at least one processor and at least one memory. The at least one memory comprises computer program codes; the at least one memory and the computer program codes are configured to be used in collaboration with the at least one processor, the first communication device 450 at least: receives a first signaling; sets contents of a second message at a first moment; transmits a first radio signal, the first radio signal comprises the second message; at a second moment, as a response to not receiving a third message, determines performing a first procedure; herein, the first signaling is used to determine a first time length; the second message comprises link maintenance related information; the third message is triggered by the second message; the second moment is after the first moment and its interval with the first moment is a second time length, and the first time length is used to determine the second time length; the second time length is related to whether the second message is relayed.

In one subembodiment of the above embodiment, the first communication device 450 comprises: a memory that stores a computer readable instruction program. The computer readable instruction program generates an action when executed by at least one processor. The action includes: receiving a first signaling; setting contents of a second message at a first moment; transmitting a first radio signal, the first radio signal comprising the second message; at a second moment, as a response to not receiving a third message, determining performing a first procedure; herein, the first signaling is used to determine a first time length; the second message comprises link maintenance related information; the third message is triggered by the second message; the second moment is after the first moment and its interval with the first moment is a second time length, and the first time length is used to determine the second time length; the second time length is related to whether the second message is relayed.

In one subembodiment of the above embodiment, the second communication device 410 comprises: at least one processor and at least one memory. The at least one memory comprises computer program codes; the at least one memory and the computer program codes are configured to be used in collaboration with the at least one processor. The second communication device 410 at least: monitors a first radio signal, the first radio signal comprises a second message; as a response to receiving the first radio signal, transmits a second radio signal, the second radio signal comprises a second message; or, as a response to not receiving the first radio signal, drops transmitting a second radio signal; herein, a first signaling is received by a transmitter of the first radio signal; the first signaling is used to determine a first time length; the second message comprises link maintenance related information; contents of the second message are set at a first moment; at a second moment, as a response to not receiving a third message, a first procedure is determined to be performed; the third message is triggered by the second message; the second moment is after the first moment and its interval with the first moment is a second time length, and the first time length is used to determine the second time length; the second time length is related to whether the second message is relayed.

In one subembodiment of the above embodiment, the second communication device 410 comprises: a memory that stores a computer readable instruction program. The computer readable instruction program generates an action when executed by at least one processor. The action includes: monitoring a first radio signal, the first radio signal comprising a second message; as a response to receiving the first radio signal, transmitting a second radio signal, the second radio signal comprising a second message; or, as a response to not receiving the first radio signal, dropping transmitting a second radio signal; herein, a first signaling is received by a transmitter of the first radio signal; the first signaling is used to determine a first time length; the second message comprises link maintenance related information; contents of the second message are set at a first moment; at a second moment, as a response to not receiving a third message, a first procedure is determined to be performed; the third message is triggered by the second message; the second moment is after the first moment and its interval with the first moment is a second time length, and the first time length is used to determine the second time length; the second time length is related to whether the second message is relayed.

In one embodiment, the first communication device 450 corresponds to the second node in the present application, and the second communication device 410 corresponds to the third node in the present application.

In one subembodiment of the above embodiment, the first communication device 450 comprises: at least one processor and at least one memory. The at least one memory comprises computer program codes; the at least one memory and the computer program codes are configured to be used in collaboration with the at least one processor, the first communication device 450 at least: monitors a first radio signal, the first radio signal comprises a second message; as a response to receiving the first radio signal, transmits a second radio signal, the second radio signal comprises a second message; or, as a response to not receiving the first radio signal, drops transmitting a second radio signal; herein, a first signaling is received by a transmitter of the first radio signal; the first signaling is used to determine a first time length; the second message comprises link maintenance related information; contents of the second message are set at a first moment; at a second moment, as a response to not receiving a third message, a first procedure is determined to be performed; the third message is triggered by the second message; the second moment is after the first moment and its interval with the first moment is a second time length, and the first time length is used to determine the second time length; the second time length is related to whether the second message is relayed.

In one subembodiment of the above embodiment, the first communication device 450 comprises: a memory that stores a computer readable instruction program. The computer readable instruction program generates an action when executed by at least one processor. The action includes: monitoring a first radio signal, the first radio signal comprising a second message; as a response to receiving the first radio signal, transmitting a second radio signal, the second radio signal comprising a second message; or, as a response to not receiving the first radio signal, dropping transmitting a second radio signal; herein, a first signaling is received by a transmitter of the first radio signal; the first signaling is used to determine a first time length; the second message comprises link maintenance related information; contents of the second message are set at a first moment; at a second moment, as a response to not receiving a third message, a first procedure is determined to be performed; the third message is triggered by the second message; the second moment is after the first moment and its interval with the first moment is a second time length, and the first time length is used to determine the second time length; the second time length is related to whether the second message is relayed.

In one subembodiment of the above embodiment, the second communication device 410 comprises: at least one processor and at least one memory. The at least one memory comprises computer program codes; the at least one memory and the computer program codes are configured to be used in collaboration with the at least one processor. The second communication device 410 at least: monitors a second radio signal, the second radio signal comprises a second message; as a response to receiving the second message, transmits a third message; or, as a response to not receiving the second message, drops transmitting a third message; herein, a first radio signal is transmitted, the first radio signal comprises the second message; a first signaling is used to determine a first time length; the second message comprises link maintenance related information; contents of the second message are set at a first moment; at a second moment, as a response to not receiving a third message, a first procedure is determined to be performed; the third message is triggered by the second message; the second moment is after the first moment and its interval with the first moment is a second time length, and the first time length is used to determine the second time length; the second time length is related to whether the second message is relayed.

In one subembodiment of the above embodiment, the second communication device 410 comprises: a memory that stores a computer readable instruction program. The computer readable instruction program generates an action when executed by at least one processor. The action includes: monitoring a second radio signal, the second radio signal comprising a second message; as a response to receiving the second message, transmitting a third message; or, as a response to not receiving the second message, dropping transmitting a third message; herein, a first radio signal is transmitted, the first radio signal comprises the second message; a first signaling is used to determine a first time length; the second message comprises link maintenance related information; contents of the second message are set at a first moment; at a second moment, as a response to not receiving a third message, a first procedure is determined to be performed; the third message is triggered by the second message; the second moment is after the first moment and its interval with the first moment is a second time length, and the first time length is used to determine the second time length; the second time length is related to whether the second message is relayed.

In one embodiment, the antenna 452, the receiver 454, the receiving processor 456, the controller/processor 459 are used to receive a first signaling; at least one of the antenna 420, the transmitter 418, the transmitting processor 416, or the controller/processor 475 is used to transmit the first signaling.

In one embodiment, the antenna 452, the receiver 454, the receiving processor 456, and the controller/processor 459 are used to receive a second signaling; at least one of the antenna 420, the transmitter 418, the transmitting processor 416, or the controller/processor 475 is used to transmit a second signaling.

In one embodiment, the antenna 452, the transmitter 454, the transmitting processor 468, and the controller/processor 459 are used to transmit a second message; at least one of the antenna 420, the receiver 418, the receiving processor 470, or the controller/processor 475 is used to receive a second message.

In one embodiment, the antenna 452, the receiver 454, the receiving processor 456, and the controller/processor 459 are used to receive a third message; at least one of the antenna 420, the transmitter 418, the transmitting processor 416, or the controller/processor 475 is used to transmit a third message.

In one embodiment, the antenna 452, the transmitter 454, the transmitting processor 468, and the controller/processor 459 are used to transmit a first radio signal; at least one of the antenna 420, the receiver 418, the receiving processor 470, or the controller/processor 475 is used to receive a first radio signal.

In one embodiment, the antenna 452, the transmitter 454, the transmitting processor 468, and the controller/processor 459 are used to transmit a second radio signal; at least one of the antenna 420, the receiver 418, the receiving processor 470, or the controller/processor 475 is used to receive a second radio signal.

In one embodiment, the antenna 452, the receiver 454, the receiving processor 456, and the controller/processor 459 are used to receive a first feedback; at least one of the antenna 420, the transmitter 418, the transmitting processor 416, or the controller/processor 475 is used to transmit a first feedback.

In one embodiment, the first communication device 450 is a UE.

In one embodiment, the first communication device 450 is a base station.

In one embodiment, the first communication device 450 is a relay.

In one embodiment, the second communication device 410 is a UE.

In one embodiment, the second communication device 410 is a base station.

In one embodiment, the second communication device 410 is a relay.

Embodiment 5

Figure 5:
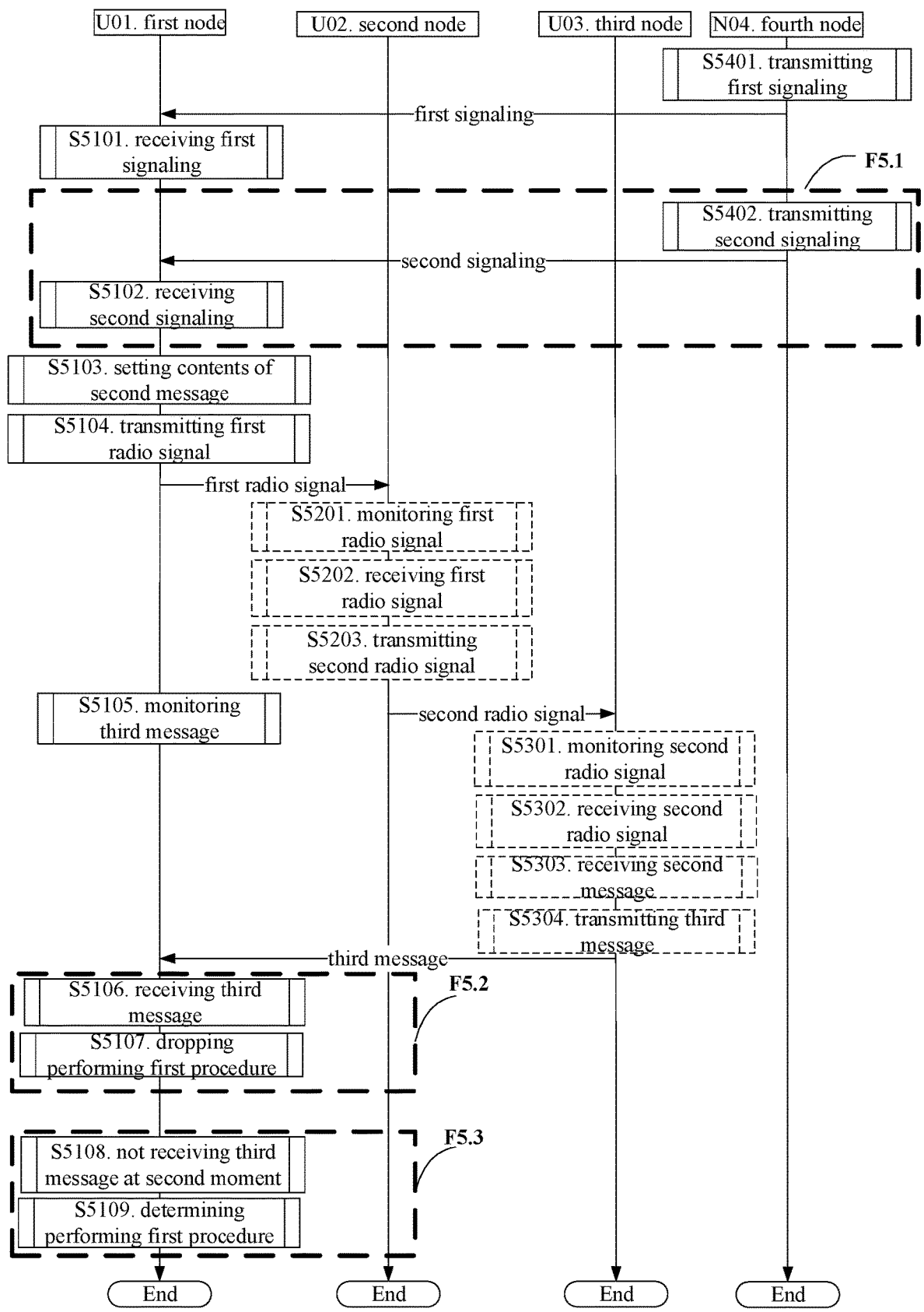
FIG. 5 illustrates a flowchart of radio signal transmission according to one embodiment of the present application.

Embodiment 5 illustrates a flowchart of radio signal transmission according to one embodiment in the present application, as shown in FIG. 5. It is particularly underlined that the order illustrated in the embodiment does not put constraints over sequences of signal transmissions and implementations.

The first node U01 receives a first signaling in step S5101; receives a second signaling in step S5102; in step S5103, sets contents of a second message at a first moment; transmits a first radio signal in step S5104; monitors a third message in step S5105; receives a third message in step S5106; drops performing a first procedure in step S5107; does not receive a third message at a second moment in step S5108; in step S5109, at a second moment, as a response to not receiving a third message, determines performing a first procedure.

The second node U02 monitors a first radio signal in step S5201; receives a first radio signal in step S5202; in step S5203, as a response to receiving the first radio signal, transmits a second radio signal, or, as a response to not receiving the first radio signal, drops transmitting a second radio signal.

The third node U03 monitors a second radio signal in step S5301; receives a second radio signal in step S5302; receives a second message in step S5303; in step S5304, as a response to receiving the second message, transmits a third message, or, as a response to not receiving the second message, drops transmitting a third message.

The fourth node N04 transmits a first signaling in step S5401; transmits a second signaling in step S5402.

In embodiment 5, the first radio signal comprises the second message; the second radio signal comprises the second message; the first signaling is used to determine a first time length; the second message comprises link maintenance related information; the third message is triggered by the second message; the second moment is after the first moment and its interval with the first moment is a second time length, and the first time length is used to determine the second time length; the second time length is related to whether the second message is relayed; the second signaling indicates a first offset, the first offset and the first time length are used to determine the second time length.

In one embodiment, a transmitter of the second signaling comprises the second node in the present application.

In one embodiment, a transmitter of the second signaling comprises the fourth node in the present application.

In one embodiment, a transmitter of the second signaling comprises a base station.

In one embodiment, a transmitter of the second signaling comprises a UE.

In one embodiment, the second signaling is transmitted via an air interface.

In one embodiment, the second signaling is transmitted via an antenna port.

In one embodiment, the second signaling is transmitted via a high-layer signaling.

In one embodiment, the second signaling is transmitted via a higher-layer signaling.

In one embodiment, the second signaling comprises a sidelink signal.

In one embodiment, the second signaling comprises a downlink signal.

In one embodiment, the second signaling comprises all or part of a high-layer signaling.

In one embodiment, the second signaling comprises all or part of a higher-layer signaling.

In one embodiment, the second signaling comprises an RRCReconfiguration message.

In one embodiment, the second signaling comprises an RRCResume message.

In one embodiment, the second signaling comprises an RRCSetup message.

In one embodiment, the second signaling comprises an SIB12 message.

In one embodiment, the first signaling comprises an RRCReestablishment message.

In one embodiment, the first signaling comprises an RRCConnectionReconfiguration message.

In one embodiment, the first signaling comprises an RRCConnectionReestablishment message.

In one embodiment, the first signaling comprises an RRCConnectionResume message.

In one embodiment, the first signaling comprises an RRCConnectionSetup message.

In one embodiment, the second signaling comprises an IE in an RRC message, and a name of the IE comprises CellGroupConfig.

In one embodiment, the second signaling comprises an IE in an RRC message, and a name of the IE comprises SL-RLC-Config.

In one embodiment, the second signaling comprises an IE in an RRC message, and a name of the IE comprises SL-RLC-BearerConfig.

In one embodiment, the second signaling comprises an IE in an RRC message, and a name of the IE comprises SL-ConfigDedicatedNR.

In one embodiment, the second signaling comprises an IE in an RRC message, and a name of the IE comprises BH-RLC-ChannelConfig.

In one embodiment, the second signaling comprises an IE in an RRC message, and a name of the IE comprises BH-LogicalChannelIdentity-Ext.

In one embodiment, the second signaling comprises an IE in an RRC message, and a name of the IE comprises RLC-BearerConfig.

In one embodiment, the first signaling comprises an IE in an RRC message, and a name of the IE comprises RadioResourceConfigDedicated.

In one embodiment, the second signaling comprises an IE in an RRC message, and a name of the IE comprises RLC-Config.

In one embodiment, the second signaling comprises a field in an RRC message, and a name of the field comprises UL-AM-RLC.

In one embodiment, the second signaling comprises a field in an RRC message, and a name of the field comprises t-PollRetransmit.

In one embodiment, the second signaling is the same as the first signaling.

In one embodiment, the second signaling is different from the second signaling.

In one embodiment, the second signaling and the first signaling are two different fields in a same RRC message.

In one embodiment, the second signaling and the first signaling are configured at the same time.

In one embodiment, the second signaling and the first signaling are not configured simultaneously.

In one embodiment, the phrase that the second signaling indicates a first offset comprises: the second signaling is used to determine the first offset.

In one embodiment, the phrase that the second signaling indicates a first offset comprises: the second signaling explicitly indicates the first offset.

In one embodiment, the phrase that the second signaling indicates a first offset comprises: the second signaling implicitly indicates the first offset.

In one embodiment, the phrase that the second signaling indicates a first offset comprises: the first offset is a field in the second signaling.

In one embodiment, the phrase that the first offset and the first time length are used to determine the second time length comprises: a sum of the first offset and the first time length is equal to the second time length.

In one embodiment, the phrase that the first offset and the first time length are used to determine the second time length comprises: a sum of the first offset and the first time length is equal to the second time length.

In one embodiment, the first offset is related to whether the second message is relayed.

In one embodiment, the first offset is related to whether there exists the second node between the first node and the third node in the present application.

In one embodiment, the phrase that the second radio signal comprises the second message comprises: the second radio signal comprises all information in the second message.

In one embodiment, the phrase that the second radio signal comprises the second message comprises: the second radio signal comprises partial information in the second message.

In one embodiment, the phrase that the second radio signal comprises the second message comprises: the second radio signal comprises the first radio signal, and the first radio signal comprises the second message.

In one embodiment, the second radio signal comprises all of the first radio signal.

In one embodiment, the second radio signal at least comprises part of the first radio signal.

In one embodiment, the first radio signal and the second radio signal have a same SN.

In one embodiment, the first radio signal and the second radio signal have different SNs.

In one subembodiment of the above embodiment, the second node U02 receives the first radio signal, renumbers an SN of the first radio signal to generate the second radio signal.

In one subembodiment of the above embodiment, the first radio signal carries a first SN, the second radio signal carries a second SN, and the second node U02 reserves a mapping relation between the first SN and the second SN.

In one embodiment, when the second node U02 in the present application receives the first radio signal, if the first radio signal comprises an AMD PDU, a P field in the AMD PDU is set as "1", the second radio signal comprises another AMD PDU, and a P field in the another AMD PDU is set to "1".

In one embodiment, when the second node U02 in the present application receives the first radio signal, if the first radio signal comprises an AMD PDU, a P field in the AMD PDU is set as "1", the second radio signal comprises another AMD PDU, and a P field in the another AMD PDU is set to "0".

In one subembodiment of the above embodiment, there also exists an AMD PDU other than the AMD PDU in the second node U02 not being forwarded.

In one subsidiary embodiment of the above embodiment, the other AMD PDUs comprise AMD PDUs from other nodes.

In one subsidiary embodiment of the above embodiment, the other AMD PDUs comprise an AMD PDU from the first node U01.

In one subembodiment of the above embodiment, a timer of the second node U02 is still running.

In one embodiment, when the second node U02 in the present application receives the first radio signal, if the first radio signal comprises an AMD PDU, a P field in the AMD PDU is set as "1", the AMD PDU is preferentially transmitted.

In one subembodiment of the above embodiment, the phrase of preferentially transmitting the AMD PDU comprises: if there exist other AMD PDUs before the AMD PDU, transmitting the AMD PDU first, then transmitting the other AMD PDUs.

In one subembodiment of the above embodiment, the phrase of preferentially transmitting the AMD PDU comprises: a priority of the AMD PDU is higher than the other AMD PDUs.

In one subembodiment of the embodiment, the other AMD PDUs are from a node other than the first node U01.

In one subembodiment of the embodiment, the other AMD PDUs are from the first node U01.

In one embodiment, a value of a P field in the second radio signal and a value of a P field in the first radio signal are different.

In one embodiment, a value of a P field in the second radio signal and a value of a P field in the first radio signal are the same.

In one embodiment, the phrase of as a response to receiving the first radio signal comprises: when the first radio signal is correctly received.

In one embodiment, the phrase of as a response to receiving the first radio signal comprises: when the first radio signal is received.

In one embodiment, the first message formed after the first node is delivered to the lower layer is the first radio signal.

In one embodiment, a message formed by the second radio signal after the third node is received and delivered to a higher layer is the second message.

In one embodiment, the lower layer comprises an RLC sublayer.

In one embodiment, the lower layer comprises a MAC sublayer.

In one embodiment, the lower layer comprises a PHY layer.

In one embodiment, the upper layer comprises an RRC sublayer.

In one embodiment, the upper layer comprises a PDCP sublayer.

In one embodiment, the first node U01 comprises a UE.

In one embodiment, the first node U01 comprises a source node.

In one embodiment, the first node U01 comprises a base station.

In one embodiment, the second node U02 comprises a UE.

In one embodiment, the second node U02 comprises a base station.

In one embodiment, the second node U02 is used for a UE-network relay.

In one embodiment, the second node U02 is used for a UE-UE relay.

In one embodiment, the second node U02 is used for a base station-base station relay.

In one embodiment, the third node U03 comprises a UE.

In one embodiment, the third node U03 comprises a base station.

In one embodiment, the third node U03 comprises a destination node.

In one embodiment, the fourth node N04 comprises a base station.

In one embodiment, the first node U01 is located within the coverage of the fourth node N04.

In one embodiment, the first node U01 is located outside the coverage of the fourth node N04.

In one embodiment, the first node U01 has an RRC connection with the fourth node N04.

In one embodiment, the first node U01 does not have an RRC connection with the fourth node N04.

In one embodiment, the first node U01 is in RRC_CONNECTED state, or RRC_INACTIVE state, or RRC_IDLE state.

In one embodiment, the second node U02 is in RRC_CONNECTED state, or RRC_INACTIVE state, or RRC_IDLE state.

In one embodiment, the third node U03 is in RRC_CONNECTED state, or RRC_INACTIVE state, or RRC_IDLE state.

In one embodiment, the dotted box F5.1 is optional.

In one embodiment, the dotted box F5.2 is optional.

In one embodiment, the dotted box F5.3 is optional.

In one embodiment, the dotted box F5.1 exists.

In one embodiment, the dotted box F5.1 does not exist.

In one embodiment, the dotted box F5.2 and the dotted box F5.3 do not exist at the same time.

In one subembodiment of the embodiment, the dotted box F5.2 exists, and the dotted box F5.3 does not exist.

In one subembodiment of the embodiment, the dotted box F5.3 exists, and the dotted box F5.2 does not exist.

In one embodiment, the dotted steps in FIG. 5 are optional.

In one subembodiment of the above embodiment, the first radio signal is received by the second node U02.

In one subembodiment of the above embodiment, the first radio signal is not received by the second node U02.

In one subembodiment of the above embodiment, the second radio signal is transmitted by the second node U02.

In one subembodiment of the above embodiment, the second radio signal is not transmitted by the second node U02.

In one subembodiment of the above embodiment, the second radio signal is received by the third node U03.

In one subembodiment of the above embodiment, the second radio signal is not received by the third node U03.

In one subembodiment of the above embodiment, the second message is received by the third node U03.

In one subembodiment of the above embodiment, the second message is not received by the third node U03.

In one subembodiment of the above embodiment, the third message is transmitted by the third node U03.

In one subembodiment of the above embodiment, the third message is not transmitted by the third node U03.

Embodiment 6

Figure 6:
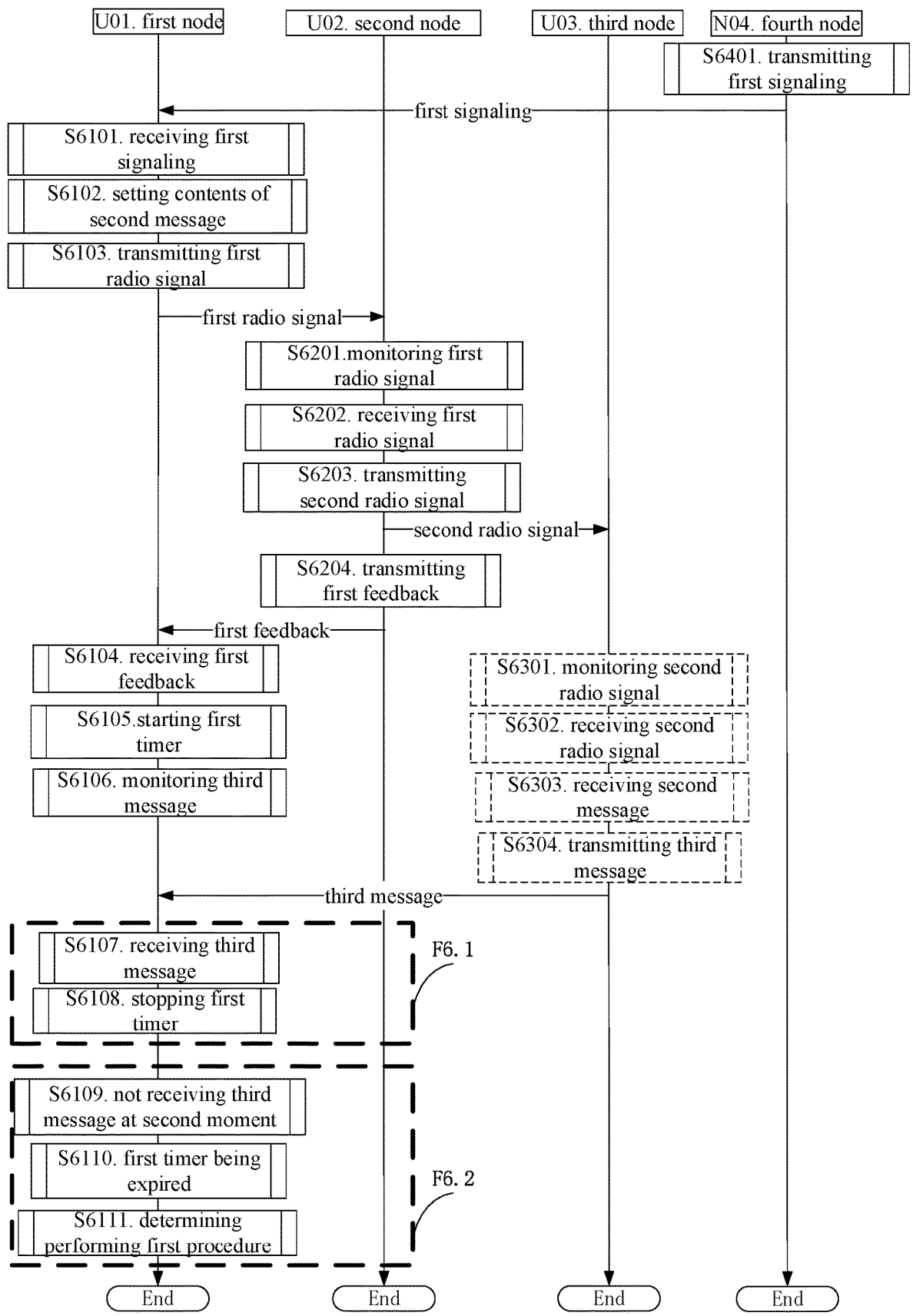
FIG. 6 illustrates a flowchart of radio signal transmission according to another embodiment of the present application.

Embodiment 6 illustrates a flowchart of radio signal transmission according to another embodiment of the present application, as shown in FIG. 6. It is particularly underlined that the order illustrated in the embodiment does not put constraints over sequences of signal transmissions and implementations.

The first node U01 receives a first signaling in step S6101; in step S6102, sets contents of a second message at a first moment; transmits a first radio signal in step S6103; receives a first feedback in step S6104; in step S6105, as a response to receiving the first feedback, starts a first timer; monitors a third message in step S6106; receives a third message in step S6107; stops a first timer in step S6108; does not receive a third message at a second moment in step S6109; the first timer is expired in step S6110; in step S6111, at a second moment, as a response to not receiving a third message, determines performing a first procedure.

The second node U02 monitors a first radio signal in step S6201; receives a first radio signal in step S6202; in step S6203, as a response to receiving the first radio signal, transmits a second radio signal, or, as a response to not receiving the first radio signal, drops transmitting a second radio signal; transmits a first feedback in step S6204.

The third node U03 monitors a second radio signal in step S6301; receives a second radio signal in step S6302; receives a second message in step S6302; in step S6303, as a response to receiving the second message, transmits a third message, or, as a response to not receiving the second message, drops transmitting a third message.

The fourth node N04 transmits a first signaling in step S6401.

In embodiment 6, the first radio signal comprises the second message; the second radio signal comprises a second message; the first signaling is used to determine a first time length; the second message comprises link maintenance related information; the third message is triggered by the second message; the second moment is after the first moment and its interval with the first moment is a second time length, and the first time length is used to determine the second time length; the second time length is related to whether the second message is relayed; a running time of the first timer reaching the first time length is used to determine that the first timer is expired; a moment when the first timer is expired is used to determine the second moment; the first feedback is used to determine that the first radio signal is relayed and forwarded.

In one embodiment, the first feedback comprises first cache status information.

In one subembodiment of the above embodiment, the first cache status information indicates that cached data volume of the second node U02 reaches a given threshold.

In one subembodiment of the above embodiment, the first cache status information indicates that cached data volume of the second node U02 does not reach a given threshold.

In one subembodiment of the above embodiment, the first cache status information indicates cached data volume of the second node U02.

In one subembodiment of the above embodiment, the cached data volume comprises data volume in transmitting cache of the second node U02.

In one subembodiment of the above embodiment, the cached data volume comprises data volume from the first node U01 cached by the second node U02.

In one subembodiment of the above embodiment, the cached data volume comprises data volume to be transmitted.

In one subembodiment of the above embodiment, the cached data volume comprises data volume successfully received from the first node U01 but the forwarding is not completed.

In one subembodiment of the above embodiment, the first cached state information comprises N1 bit(s), N1 being a positive integer greater than 0 and not greater than 2048.

In one subsidiary embodiment of the subembodiment, N1 is equal to 1.

In one subsidiary embodiment of the subembodiment, N1 is greater than 1.

In one embodiment, the first feedback comprises a STATUS report.

In one subembodiment of the embodiment, the STATUS report comprises a D/C field.

In one subembodiment of the embodiment, the STATUS report comprises a CPT field.

In one subembodiment of the embodiment, the STATUS report comprises an Acknowledgement SN field.

In one subembodiment of the embodiment, the STATUS report comprises a Negative Acknowledgement SN field.

In one subembodiment of the embodiment, a field in the STATUS report refers to a field in a STATUS PDU in TS38.322.

In one subembodiment of the embodiment, the STATUS report comprises first cached status information.

In one subembodiment of the embodiment, the STATUS report adds a first field based on a STATUS PDU in TS38.322, and the first field indicates the first cached status information.

In one embodiment, the first feedback comprises a physical-layer signal.

In one embodiment, the first feedback comprises a MAC-layer signal.

In one embodiment, the first feedback comprises a MAC-layer signal.

In one embodiment, a transmitter of the first feedback comprises relay.

In one embodiment, when the second signaling is forwarded by the second node U02, the first feedback is transmitted.

In one embodiment, the first information is that a field in the second signaling is used to determine that the second signaling carries the first information.

In one subembodiment of the above embodiment, the first information comprises a field in an RLC PDU.

In one subembodiment of the above embodiment, the first information comprises a field in a MAC PDU.

In one subembodiment of the above embodiment, the first information is used to indicate a PDU with a higher priority.

In one subembodiment of the above embodiment, the first information is used to indicate a PDU carrying a high priority.

In one subembodiment of the above embodiment, the first information is used to indicate carrying an RRCReconfigurationSidelink.

In one embodiment, the second signaling being transmitted through a container is used to determine that the second signaling carries the first information.

In one subembodiment of the above embodiment, the container comprises Contener.

In one subembodiment of the above embodiment, the container is an L3 container.

In one subembodiment of the above embodiment, the container is an L2 container.

In one subembodiment of the above embodiment, the container comprises an RLC container.

In one embodiment, the dotted box F6.1 is optional.

In one embodiment, the dotted box F6.2 is optional.

In one embodiment, the dotted box F6.1 and the dotted box F6.2 do not exist at the same time.

In one subembodiment of the embodiment, the dotted box F6.1 exists, and the dotted box F6.2 does not exist.

In one subembodiment of the embodiment, the dotted box F6.2 exists, and the dotted box F6.1 does not exist.

In one embodiment, the dotted steps in FIG. 6 are optional.

In one subembodiment of the above embodiment, the second radio signal is received by the third node U03.

In one subembodiment of the above embodiment, the second radio signal is not received by the third node U03.

In one subembodiment of the above embodiment, the second message is received by the third node U03.

In one subembodiment of the above embodiment, the second message is not received by the third node U03.

In one subembodiment of the above embodiment, the third message is transmitted by the third node U03.

In one subembodiment of the above embodiment, the third message is not transmitted by the third node U03.

In one embodiment, the meaning of reaching comprises being equal to.

In one embodiment, the meaning of reaching comprises being not less than.

Embodiment 7

Figure 7:
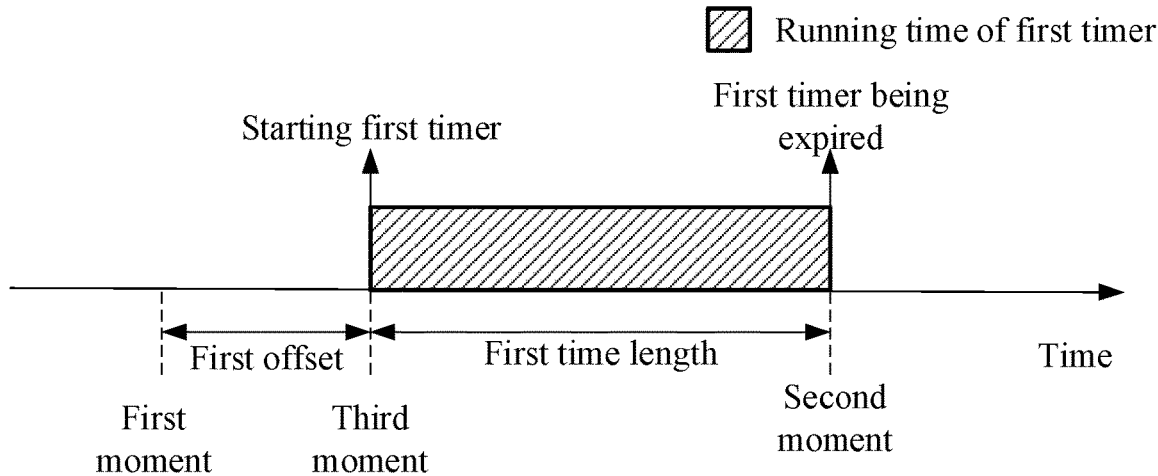
FIG. 7 illustrates a schematic diagram of a first timer according to one embodiment of the present application.

Embodiment 7 illustrates a schematic diagram of a first timer according to one embodiment of the present application, as shown in FIG. 7. In FIG. 7, the horizontal axis represents time; the slash-filled solid box represents a running time of a first timer; a first moment, a third moment, and a second moment are three incremental moments in time; set contents of a second message at first moment; start the first timer at the third moment; at the second moment, the first timer is expired.

In embodiment 7, when a running time of a first timer reaches the first time length, determine that the first timer is expired; a moment when the first timer is expired is used to determine the second moment; a third moment is used to determine starting the first timer; the third moment is after the first moment, and an interval between the third moment and the first moment is equal to the first offset.

In one embodiment, a maximum running time of the first timer is equal to the first time length.

In one embodiment, as a response to setting contents of the second message, start the first timer after delaying the first offset.

In one embodiment, when a running time of the first timer reaches the first time length, the first timer is expired.

In one embodiment, when the first timer is running, as a response to receiving the third message, the first timer is stopped.

In one subembodiment of the above embodiment, a running time of the first timer comprises that the first timer is greater than 0 and is not greater than the first time length.

In one subembodiment of the embodiment, the first timer is timing.

In one embodiment, the not being greater than comprises being less than.

In one embodiment, the not being greater than comprises being less than or being equal to.

In one embodiment, the meaning of the phrase that "when a running time of a first timer reaches the first time length, determining that the first timer is expired" comprises: a maximum running time of the first timer is equal to a first time length.

In one embodiment, the meaning of the phrase that "when a running time of a first timer reaches the first time length, determining that the first timer is expired" comprises: a timing of the first timer being not less than the first time length is used to determine that the first timer is expired.

In one embodiment, the meaning of the phrase that "when a running time of a first timer reaches the first time length, determining that the first timer is expired" comprises: when a value of the first timer is equal to the first time length, the first timer is expired.

In one embodiment, the meaning of the phrase that "when a running time of a first timer reaches the first time length, determining that the first timer is expired" comprises: a moment when the first timer reaches the first time length is a moment when the first timer is expired.

In one embodiment, the meaning of the phrase that "when a running time of a first timer reaches the first time length, determining that the first timer is expired" comprises: at the second moment, determining that the first timer is expired.

In one embodiment, the phrase that a moment when the first timer is expired is used to determine the second time comprises: a moment when the first timer is expired is the second moment.

In one embodiment, the phrase that a moment when the first timer is expired is used to determine the second moment comprises: at the second moment, the first timer is expired.

In one embodiment, the phrase that a moment when the first timer is expired is used to determine the second moment comprises: the second moment refers to a moment when the first timer is expired.

In one embodiment, the meaning of reaching comprises being not less than.

In one embodiment, the meaning of reaching comprises being equal to.

In one embodiment, the meaning of reaching comprises being greater than.

In one embodiment, the running time comprises timing.

In one embodiment, the running time comprises an experienced time.

In one embodiment, the behavior of determining that the first timer is expired comprises determining that timing of the first timer reaches a maximum value.

In one embodiment, the behavior of determining that the first timer is expired comprises determining that the first timer cannot continue timing.

In one embodiment, the phrase of a third moment being used to start the first timer comprises: at the third moment, starting the first timer.

In one embodiment, the phrase of a third moment being used to start the first timer comprises: at the third moment, the first timer starts timing.

In one embodiment, the phrase that the third moment is after the first moment comprises: the third moment is greater than the first moment.

In one embodiment, the phrase that the third moment is after the first moment comprises: the third moment is later than the first moment.

In one embodiment, the phrase that an interval between the third moment and the first moment is equal to the first offset comprises: an absolute value of a difference value between the third moment and the first moment is equal to the first offset.

In one embodiment, the phrase that an interval between the third moment and the first moment is equal to the first offset comprises: a moment at which the first offset passes from the first moment is the third moment.

In one embodiment, the third moment refers to any moment on time.

In one embodiment, the third moment refers to a specific moment.

In one embodiment, the third moment refers to a specific time.

In one embodiment, the third moment refers to a moment when the first timer is activated.

Embodiment 8

Figure 8:
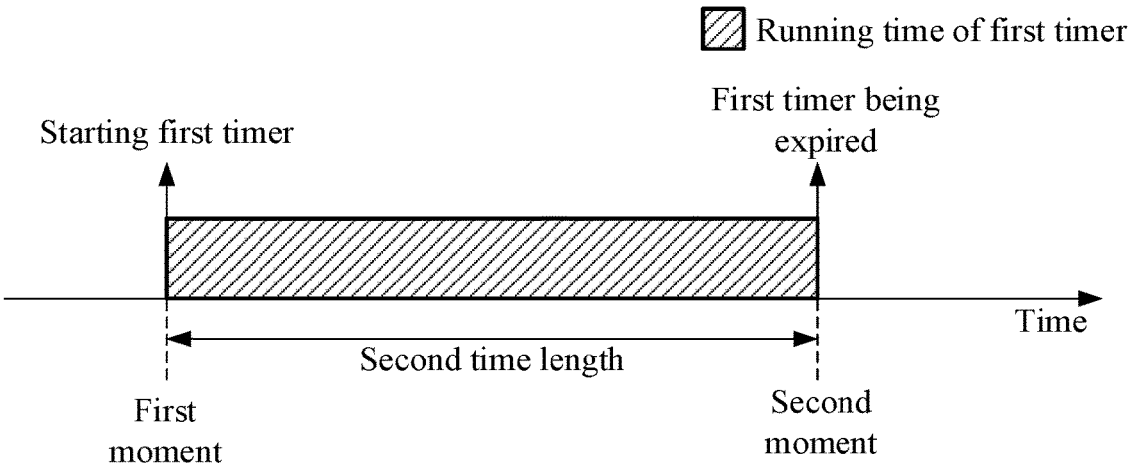
FIG. 8 illustrates a schematic diagram of a first timer according to another embodiment of the present application.

Embodiment 8 illustrates a schematic diagram of a first timer according to another embodiment of the present application, as shown in FIG. 8. In FIG. 8, the horizontal axis represents time; the slash-filled solid box represents a running time of a first timer; a first moment and a second moment are two incremental moments in time; start the first timer at a first moment; at a second moment, the first timer is expired.

In embodiment 8, when a running time of a first timer is equal to the second time length, determine that the first timer is expired; a moment when the first timer is expired is used to determine the second moment; herein, the first moment is used to determine starting the first timer.

In one embodiment, a maximum running time of the first timer is equal to the second time length, and the second time length is equal to a sum of the first time length and the first offset.

In one embodiment, as a response to setting contents of the second message, start the first timer.

In one embodiment, when a running time of the first timer reaches the second time length, the first timer is expired.

In one embodiment, when the first timer is running, as a response to receiving the third message, the first timer is stopped.

In one subembodiment of the embodiment, a running period of the first timer comprises that the first timer is greater than 0 and is not greater than the second time length.

In one subembodiment of the embodiment, the first timer is timing.

In one embodiment, at first moment, contents of the second message are set; and, start the first timer at a first moment.

In one embodiment, when a running time of the first timer is not greater than the second time length, and the third message is received, the first timer is stopped.

In one embodiment, the meaning of the phrase that "when a running time of a first timer is equal to the second time length, determining that the first timer is expired" comprises: a maximum running time of the first timer is equal to the second time length.

In one embodiment, the meaning of the phrase that "when a running time of a first timer is equal to the second time length, determining that the first timer is expired" comprises: a timing of the first timer not being less than the second time length is used to determine that the first timer is expired.

In one embodiment, the meaning of the phrase that "when a running time of a first timer reaches the second time length, determining that the first timer is expired" comprises: when a value of the first timer is equal to the second time length, the first timer is expired.

In one embodiment, the meaning of the phrase that "when a running time of a first timer reaches the second time length, determining that the first timer is expired" comprises: a moment when the first timer reaches the second time length is a moment when the first timer is expired.

In one embodiment, the meaning of the phrase that "when a running time of a first timer reaches the second time length, determining that the first timer is expired" comprises: at the second moment, determining that the first timer is expired.

In one embodiment, the phrase of the first moment being used to start the first timer comprises: at the first moment, starting the first timer.

In one embodiment, the phrase of the first moment being used to start the first timer comprises: at the first moment, the first timer starts timing.

In one embodiment, a time interval from the first timer being started to the first timer being expired is equal to the second time length.

In one embodiment, the phrase of the first moment being used to start the first timer comprises: setting contents of the second message is used to start the first timer.

In one subembodiment of the embodiment, when setting contents of the second message is completed, the first timer is started.

In one subembodiment of the embodiment, setting contents of the second message and starting the first timer are performed at the same time.

In one subembodiment of the embodiment, setting contents of the second message and starting the first timer are performed sequentially.

In one subembodiment of the embodiment, starting the first timer and setting contents of the second message are sequentially performed.

Embodiment 9

Figure 9:
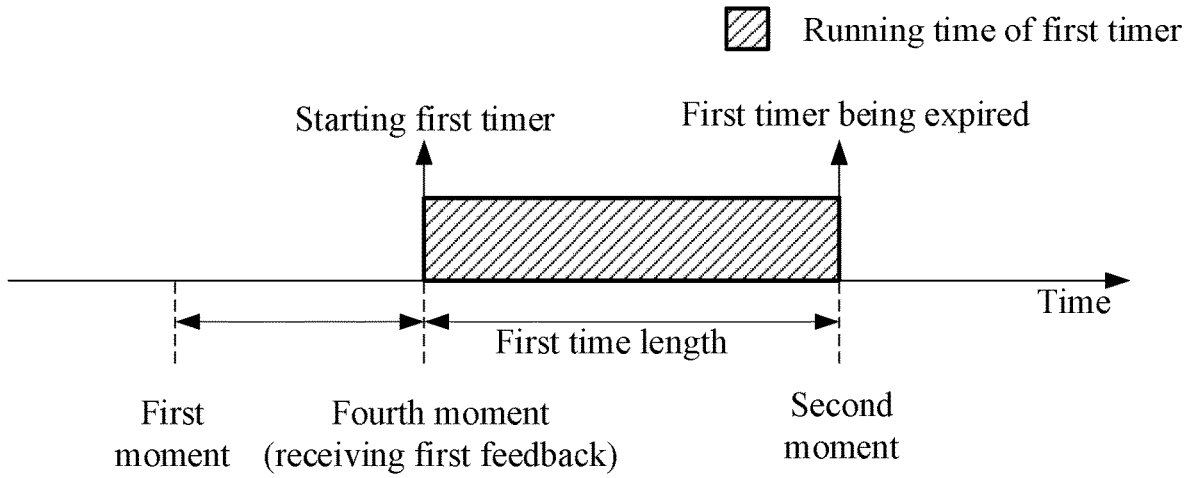
FIG. 9 illustrates a schematic diagram of a first timer according to another embodiment of the present application.

Embodiment 9 illustrates a schematic diagram of a first timer according to another embodiment of the present application, as shown in FIG. 9. In FIG. 9, the horizontal axis represents time; the slash-filled solid box represents a running time of a first timer; a first moment, a fourth moment, and a second moment are three incremental moments in time; set contents of a second message at first moment; start the first timer at a fourth moment; at a second moment, the first timer is expired; a time interval between the fourth moment and the second moment is equal to the first time length.

In Embodiment 9, the first node in the present application receives a first feedback; as a response to receiving the first feedback, starts a first timer; a running time of the first timer reaching the first time length is used to determine that the first timer is expired; a moment when the first timer is expired is used to determine the second moment; herein, the first feedback is used to determine that the first radio signal is relayed and forwarded.

In one embodiment, a maximum running time of the first timer is equal to the first time length.

In one subembodiment of the above embodiment, the maximum running time of the first timer comprises an expiration value of the first timer.

In one subembodiment of the above embodiment, the maximum running time of the first timer comprises an expiration value of the first timer.

In one subembodiment of the above embodiment, when a running time of the first timer reaches the maximum running time, the first timer is expired.

In one embodiment, as a response to setting contents of the second message, monitor the first feedback; as a response to receiving the first feedback, start the first timer.

In one embodiment, the behavior of monitoring a given signal comprises: detecting whether there exists the given signal on a channel occupied by the given signal.

In one embodiment, the behavior of monitoring a given signal comprises: monitoring the given signal.

In one embodiment, the behavior of monitoring a given signal comprises: detecting whether there exists the given signal through a Cyclic Redundancy Check (CRC) check.

In one embodiment, the behavior of monitoring a given signal comprises: detecting whether there exists the given signal through a blind detection.

In one embodiment, the behavior of monitoring a given signal comprises: detecting whether there exists the given signal through a coherent detection of a characteristic sequence.

In one embodiment, the behavior of monitoring a given signal comprises: when the second signal is detected, receiving the given signal.

In one embodiment, the behavior of monitoring a given signal comprises: monitoring a PDCCH.

In one embodiment, when a running time of the first timer reaches the first time length, the first timer is expired.

In one embodiment, when the first timer is running, and as a response to receiving the third message, the first timer is stopped.

In one subembodiment of the above embodiment, a running time of the first timer comprises that the first timer is greater than 0 and is not greater than the first time length.

In one subembodiment of the embodiment, the first timer is timing.

In one embodiment, at a fourth moment, receive the first feedback, and as a response to receiving the first feedback, start the first timer.

In one embodiment, at a fourth moment, receive the first feedback, when receiving the first feedback, start the first timer.

In one embodiment, a time interval between the fourth moment and the first moment is related to the processing function of the second node in the present application.

In one embodiment, a time interval between the fourth moment and the first moment is related to a distance between the first node in the present application and the second node in the present application.

Embodiment 10

Figure 10:
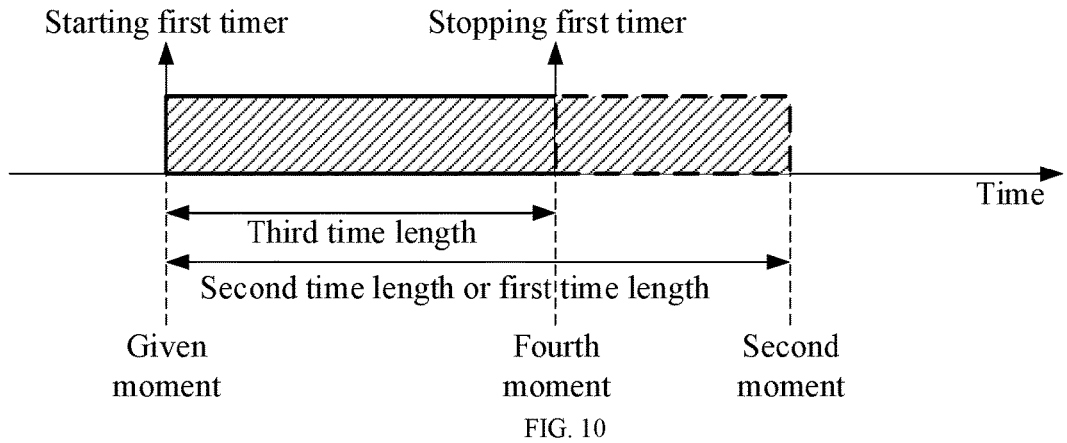
FIG. 10 illustrates a schematic diagram of a first timer according to another embodiment of the present application.

Embodiment 10 illustrates a schematic diagram of a first timer according to another embodiment of the present application, as shown in FIG. 10. In FIG. 10, the horizontal axis represents time; the slash-filled solid box represents a running time of a first timer, while the slash-filled solid box represents a remaining time of a first timer; a given moment, a fourth moment, and a second moment are three incremental moments in time; start the first timer at a first moment; stop a first timer at a fourth moment; a time interval between the fourth moment and the given moment is equal to a third time length; a time interval between the second moment and a given moment is equal to a second time length or a first time length.

In embodiment 10, in a running time of a first timer, as a response to receiving a third message, the first timer is stopped.

In one embodiment, when the first timer is less than the first time length, and the third message is received, the first timer is stopped; herein, the given moment comprises the third moment.

In one embodiment, when the first timer is less than the second time length, and the third message is received, the first timer is stopped; herein, the given moment comprises the first moment.

In one embodiment, when a first timer is running and the third message is received, the first timer is stopped.

In one embodiment, stopping the first timer comprises that the first timer stops timing.

In one embodiment, the stopping comprises stop.

In one embodiment, stopping the first timer does not trigger an expiration of the first timer.

In one embodiment, as a response to stopping the first timer, re-transmit the second message.

In one embodiment, as a response to stopping the first timer, when a negative acknowledgement is received for the second message, if an SN of the RLC SDU is not less than TX_Next_Ack and is not greater than a largest SN in an AMD PDU delivered to lower layer, which considers that the RLC SDU or the RLC SDU segment needs retransmission.

In one subembodiment of the embodiment, when it is considered that the RLC SDU or the RLC SDU segment needs to be retransmitted, if necessary, segment the RLC SDU or the RLC SDU segment.

In one subembodiment of the embodiment, when it is considered that the RLC SDU or the RLC SDU segment needs to be retransmitted, a new AMD PDU is constructed, the new AMD PDU meets a total size of an AMD PDU indicated by a special transmitting opportunity indicated by a lower layer.

In one subsidiary of the above embodiment, when a new AMD PDU is constructed, only the original RLC SDU or the RLC SDU segment is mapped into a data field of the new AMD PDU.

In one subsidiary of the above embodiment, when constructing a new AMD PDU, modify a header of the new AMD DPU.

In one subsidiary of the above embodiment, when constructing a new AMD PDU, set a value of the P field.

In one subembodiment of the embodiment, when it is considered that the RLC SDU or the RLC SDU segment needs to be retransmitted, deliver the new AMD PDU to a lower layer.

In one embodiment, the first timer does not continue running during a time interval between the fourth moment and the second moment.

In one embodiment, after the first timer is stopped, the first timer does not continue timing within a time interval between the fourth moment and the second moment.

In one embodiment, when the second message is received again, the first timer can be restarted within a time interval between the fourth moment and the second moment.

In one embodiment, during a running time of a first timer, as a response to receiving a third message, drop performing a first procedure.

In one embodiment, the given moment comprises the first moment in the present application.

In one embodiment, the given moment comprises the third moment in the present application.

In one embodiment, a time interval between the fourth moment and the given moment is equal to the third time length, and the third time length is less than a maximum running time of the first timer.

In one subembodiment of the above embodiment, the time interval between the second moment and the given moment is used to determine a maximum running time of the first timer.

In one subembodiment of the above embodiment, when the given moment comprises the first moment, a maximum running time of the first timer is equal to the second time length.

In one subembodiment of the above embodiment, when the given moment comprises the third moment, a maximum running time of the first timer is equal to the first time length.

In one embodiment, when the given moment comprises the third moment, the third time length is less than the first time length.

In one embodiment, when the given moment comprises the first moment, the third time length is less than the second time length.

Embodiment 11

Figure 11:
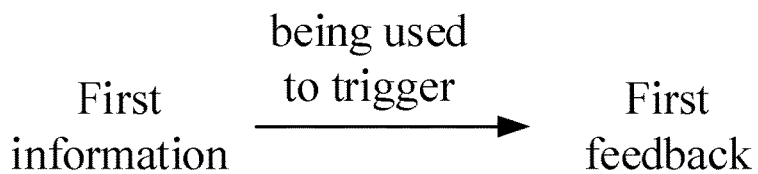
FIG. 11 illustrates a schematic diagram of first information being used to trigger a first feedback according to one embodiment of the present application.

Embodiment 11 illustrates a schematic diagram of first information being used to trigger a first feedback according to one embodiment of the present application, as shown in FIG. 11.

In embodiment 11, the second message carries first information, and the first information is used to trigger the first feedback.

In one embodiment, the first information is used to indicate that the second message is an RRC message.

In one embodiment, the first information is used to indicate that the second message is an RRC reconfiguration message.

In one embodiment, the first information is used to indicate for the second message, and the second node needs to transmit the first feedback.

In one embodiment, the phrase of the second message carrying first information comprises: the second message implicitly indicates the first information.

In one subembodiment of the above embodiment, the second message is used to implicitly indicate the first information through an SRB transmission.

In one subembodiment of the above embodiment, the second message is used to implicitly indicate the first information through a designated DRB transmission.

In one subembodiment of the above embodiment, the second message is used to implicitly indicate the first information through a designated Logical Channel (LCH) transmission.

In one embodiment, the phrase of the second message carrying first information comprises: the second message explicitly indicates the first information.

In one subembodiment of the embodiment, the first information is a field in the second message.

In one subembodiment of the above embodiment, the first information comprises a bit.

In one subsidiary embodiment of the subembodiment, when the bit is set to 1, the first feedback is triggered.

In one subsidiary embodiment of the subembodiment, when the first bit is set to 0, the first feedback is triggered.

In one subembodiment of the above embodiment, the first information comprises K1 bit(s), K1 being a positive integer greater than 1, K1 not being greater than 2048.

In one subembodiment of the above embodiment, the first information comprises a field in an RLC PDU.

In one subembodiment of the above embodiment, the first information comprises a field in a MAC PDU.

In one subembodiment of the above embodiment, the first information comprises a filed in a physical-layer signaling.

Embodiment 12

Figure 12:
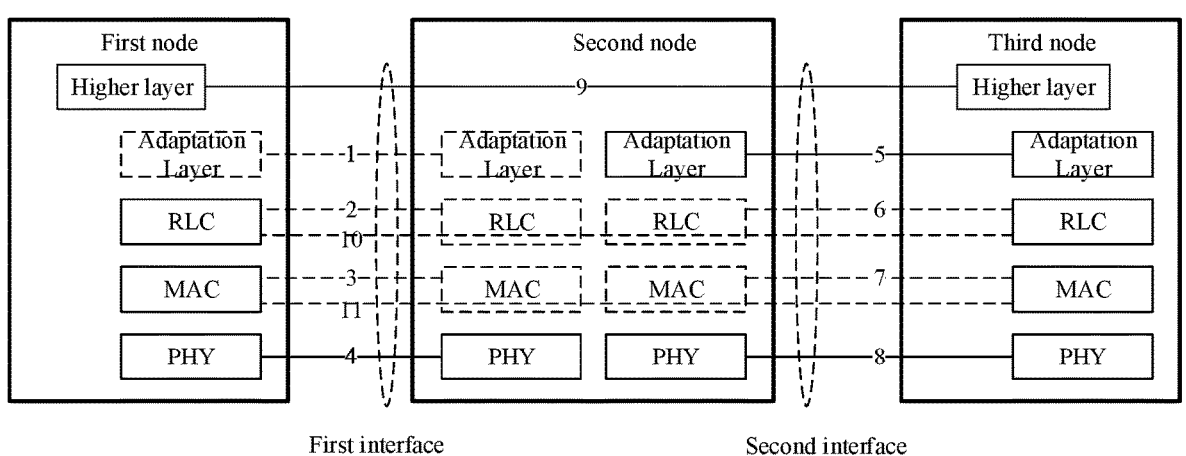
FIG. 12 illustrates a schematic diagram of a protocol stack among a first node, a second node and a third node according to one embodiment of the present application.

Embodiment 12 illustrates a schematic diagram of a protocol stack of a first node, a second node and a third node according to one embodiment of the present application, as shown in FIG. 12. In FIG. 12, each thick solid box represents a protocol stack for a node, each thin solid box or thin dashed box represents a protocol layer, and each solid or dashed line connects two peer entities; the first node and the second node are in a connection via a first interface, and the second node and the third node are in a connection via a second interface.

In one embodiment, each solid or dashed line indicates an end-to-end connection between two peer entities.

In one embodiment, the Arabic numerals on each solid or dashed line represent an end-to-end connection.

In one embodiment, a solid or dashed line between a start point and an end point indicates that a protocol stack of the starting point terminates at the end point, the starting point comprises a protocol layer of a node, and the starting point comprises a protocol layer of another node.

In one embodiment, the higher layer comprises one or more protocol layers.

In one embodiment, the higher layer comprises a PDCP sublayer.

In one embodiment, the higher layer comprises an RRC layer.

In one embodiment, the higher layer comprises an RRC sublayer.

In one embodiment, the higher layer comprises an Internet Protocol (IP) layer.

In one embodiment, the higher layer comprises a UDP layer.

In one embodiment, the higher layer comprises a Stream Control Transmission Protocol (SCTP) layer.

In one embodiment, the higher layer comprises a GPRS Tunnelling Protocol (GTP-U) layer.

In one embodiment, the first interface comprises a Backhaul (BH) RLC channel.

In one embodiment, the first interface comprises an SL RlC channel.

In one embodiment, the first interface comprises a uu interface.

In one embodiment, the first interface comprises a PC5 interface.

In one embodiment, the second interface comprises a BH RlC channel.

In one embodiment, the second interface comprises an SL RlC channel.

In one embodiment, the second interface comprises a Uu interface.

In one embodiment, the second interface comprises a PC5 interface.

In one embodiment, all or part of the dashed boxes in FIG. 12 exist.

In one embodiment, all or part of the dashed lines in FIG. 12 exist.

In one embodiment, the adaptation layer is above the RLC sublayer.

In one subembodiment of the embodiment, the adaptation layer in the first node and the adaptation layer in the second node do not exist; the RLC sub-layer and the MAC sub-layer in the second node exist; the dashed lines 1, 10, and 11 do not exist; the dashed lines 2, 6, 3, and 7 exist.

In one subembodiment of the embodiment, the adaptation layer in the first node and the adaptation layer in the second node exist; the RLC sub-layer and the MAC sub-layer in the second node exist; the dashed lines 10, and 11 do not exist; the dashed lines 1, 2, 6, 3, and 7 exist.

In one embodiment, the RLC sublayer is above the adaptation layer.

In one subembodiment of the embodiment, the adaptation layer in the first node and the adaptation layer in the second node do not exist; the RLC sub-layer in the second node does not exist; the dashed lines 1, 2, 6, and 11 do not exist; the dashed lines 3, 7, and 10 do not exist.

In one subembodiment of the embodiment, the adaptation layer in the first node and the adaptation layer in the second node exist; the RLC sub-layer in the second node does not exist; the dashed lines 2, 6, and 11 do not exist; the dashed lines 1, 3, 7, and 10 exist.

In one embodiment, the RLC sublayer and the MAC sublayer is above the adaptation layer.

In one subembodiment of the embodiment, the adaptation layer in the first node and the adaptation layer in the second node do not exist; the RLC sub-layer and the MAC sub-layer in the second node do not exist; the dashed lines 1, 2, 6, 3, and 7 do not exist; the dashed lines 10, and 11 exist.

In one subembodiment of the embodiment, the adaptation layer in the first node and the adaptation layer in the second node exist; the RLC sub-layer and the MAC sub-layer in the second node do not exist; the dashed lines 1, 2, 6, 3, and 7 do not exist; the dashed lines 10, and 11 exist.

Embodiment 13

Figure 13:
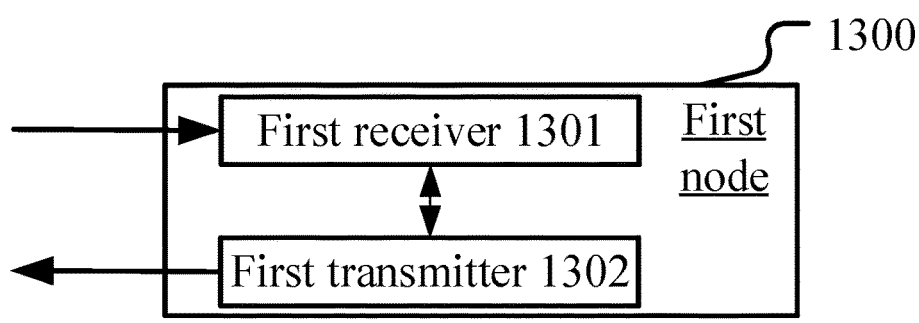
FIG. 13 illustrates a structure block diagram of a processor in a first node according to one embodiment of the present application.

Embodiment 13 illustrates a structure block diagram of a processor in a first node according to one embodiment of the present application, as shown in FIG. 13. In FIG. 13, a processor 1300 of a first node comprises a first receiver 1301 and a first transmitter 1302.

The first receiver 1301 receives a first signaling; and at a second moment, as a response to not receiving a third message, determines performing a first procedure;
   a first transmitter 1302 sets contents of a second message at a first moment; transmits a first radio signal, the first radio signal comprises the second message;

In embodiment 13, the first signaling is used to determine a first time length; the second message comprises link maintenance related information; the third message is triggered by the second message; the second moment is after the first moment and its interval with the first moment is a second time length, and the first time length is used to determine the second time length; the second time length is related to whether the second message is relayed.

In one embodiment, the first receiver 1301 receives a second signaling; herein, the second signaling indicates a first offset, the first offset and the first time length are used to determine the second time length.

In one embodiment, the first receiver 1301, when a running time of a first timer reaches the first time length, determines that the first timer is expired; a moment when the first timer is expired is used to determine the second moment; herein, a third moment is used to determine starting the first timer; the third moment is after the first moment, and an interval between the third moment and the first moment is equal to the first offset.

In one embodiment, the first receiver 1301, when a running time of a first timer is equal to the second time length, determines that the first timer is expired; a moment when the first timer is expired is used to determine the second moment; herein, the first moment is used to determine starting the first timer.

In one embodiment, the first receiver 1301 receives a first feedback; as a response to receiving the first feedback, starts a first timer; a running time of the first timer reaches the first time length is used to determine that the first timer is expired; a moment when the first timer is expired is used to determine the second moment; herein, the first feedback is used to determine that the first radio signal is relayed and forwarded.

In one embodiment, the second message carries first information, and the first information is used to trigger the first feedback.

In one embodiment, the first receiver 1301 comprises the antenna 452, the receiver 454, the multi-antenna receiving processor 458, the receiving processor 456, the controller/processor 459, the memory 460 and the data source 467 in FIG. 4 of the present application.

In one embodiment, the first receiver 1301 comprises the antenna 452, the receiver 454, the multi-antenna receiving processor 458 and the receiving processor 456 in FIG. 4 of the present application.

In one embodiment, the first receiver 1301 comprises the antenna 452, the receiver 454 and the receiving processor 456 in FIG. 4 of the present application.

In one embodiment, the first transmitter 1302 comprises the antenna 452, the transmitter 454, the multi-antenna transmitting processor 457, the transmitting processor 468, the controller/processor 459, the memory 460, and the data source 467 in FIG. 4 of the present application.

In one embodiment, the first transmitter 1302 comprises the antenna 452, the transmitter 454, the multi-antenna transmitting processor 457 and the transmitting processor 468 in FIG. 4 of the present application.

In one embodiment, the first transmitter 1302 comprises the antenna 452, the transmitter 454 and the transmitting processor 468 in FIG. 4 of the present application.

Embodiment 14

Figure 14:
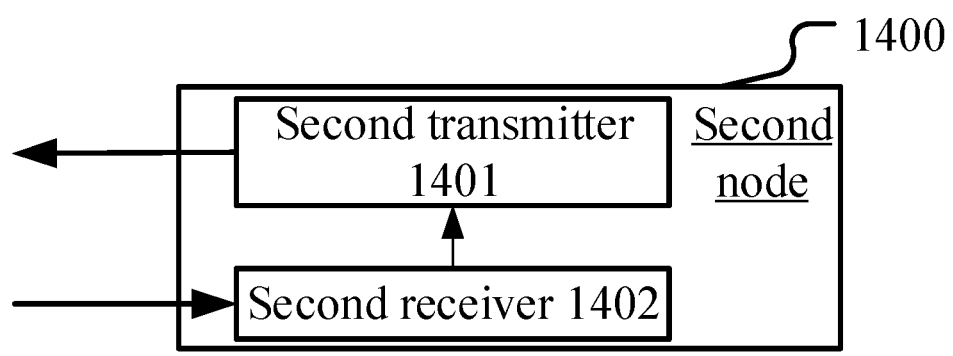
FIG. 14 illustrates a structure block diagram of a processor in a second node according to one embodiment of the present application.

Embodiment 14 illustrates a structure block diagram of a processor in a second node according to one embodiment of the present application, as shown in FIG. 14. In FIG. 14, a processor 1400 of the second node comprises a second transmitter 1401 and a second receiver 1402.

The second transmitter 1401 monitors a first radio signal, the first radio signal comprises a second message;
   the second transmitter 1402, as a response to receiving the first radio signal, transmits a second radio signal, the second radio signal comprises a second message; or, as a response to not receiving the first radio signal, drops transmitting a second radio signal.

In embodiment 14, a first signaling is received by a transmitter of the first radio signal; the first signaling is used to determine a first time length; the second message comprises link maintenance related information; contents of the second message are set at a first moment; at a second moment, as a response to not receiving a third message, a first procedure is determined to be performed; the third message is triggered by the second message; the second moment is after the first moment and its interval with the first moment is a second time length, and the first time length is used to determine the second time length; the second time length is related to whether the second message is relayed.

In one embodiment, a transmitter of the first radio signal comprises a source node, and a receiver of the second radio signal comprises a destination node.

In one embodiment, a second signaling is received by a transmitter of the first radio signal; the second signaling indicates a first offset, the first offset and the first time length are used to determine the second time length.

In one embodiment, a running time of a first timer reaching the first time length is used to determine that the first timer is expired; a moment when the first timer is expired is used to determine the second moment;
a third moment is used to determine starting the first timer; the third moment is after the first moment, and an interval between the third moment and the first moment is equal to the first offset.

In one embodiment, a running time of a first timer being equal to the second time length is used to determine that the first timer is expired; a moment when the first timer is expired is used to determine the second moment; the first moment is used to determine starting the first timer.

In one embodiment, the second transmitter 1401 transmits a first feedback; herein, as a response to receiving the first feedback, starts a first timer; a running time of the first timer reaching the first time length is used to determine that the first timer is expired; a moment when the first timer is expired is used to determine the second moment; the first feedback is used to determine that the first radio signal is relayed and forwarded.

In one embodiment, a receiver of the first feedback comprises a source node.

In one embodiment, the second message carries first information, and the first information is used to trigger the first feedback.

In one embodiment, the second transmitter 1401 comprises the antenna 420, the transmitter 418, the multi-antenna transmitting processor 471, the transmitting processor 416, the controller/processor 475 and the memory 476 in FIG. 4 of the present application.

In one embodiment, the second transmitter 1401 comprises the antenna 420, the transmitter 418, the multi-antenna transmitting processor 471 and the transmitting processor 416 in FIG. 4 of the present application.

In one embodiment, the second transmitter 1401 comprises the antenna 420, the transmitter 418 and the transmitting processor 416 in FIG. 4 of the present application.

In one embodiment, the second receiver 1402 comprises the antenna 420, the receiver 418, the multi-antenna receiving processor 472, the receiving processor 470, the controller/processor 475 and the memory 476 in FIG. 4 of the present application. In one embodiment, the second receiver 1402 comprises the antenna 420, the receiver 418, the multi-antenna receiving processor 472 and the receiving processor 470 in FIG. 4 of the present application.

In one embodiment, the second receiver 1402 comprises the antenna 420, the receiver 418 and the receiving processor 470 in FIG. 4 of the present application.

Embodiment 15

Figure 15:
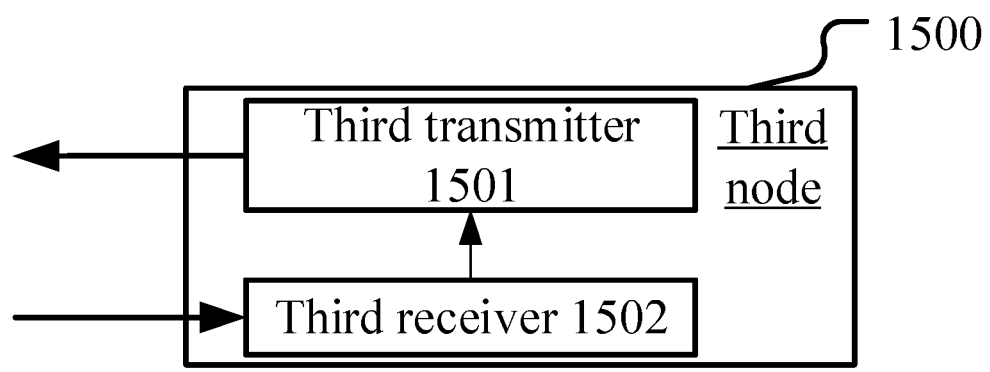
FIG. 15 illustrates a structure block diagram of a processor in a third node according to one embodiment of the present application.

Embodiment 15 illustrates a structure block diagram of a processor in a third node according to one embodiment of the present application, as shown in FIG. 15. In FIG. 15, a processor 1500 in a third node comprises a third transmitter 1501 and a second receiver 1502.

The third transmitter 1501 monitors a second radio signal, the second radio signal comprises a second message;

the third receiver 1502, as a response to receiving the second message, transmits a third message; or, as a response to not receiving the second message, drops transmitting a third message.

In embodiment 15, a first radio signal is transmitted, the first radio signal comprises the second message; a first signaling is used to determine a first time length; the second message comprises link maintenance related information; contents of the second message are set at a first moment; at a second moment, as a response to not receiving a third message, a first procedure is determined to be performed; the third message is triggered by the second message; the second moment is after the first moment and its interval with the first moment is a second time length, and the first time length is used to determine the second time length; the second time length is related to whether the second message is relayed.

In one embodiment, a transmitter of the second radio signal comprises a relay node.

In one embodiment, a receiver of the third message comprises a relay node.

In one embodiment, a receiver of the third message comprises a source node.

In one embodiment, a second signaling indicates a first offset, the first offset and the first time length are used to determine the second time length.

In one embodiment, a running time of a first timer reaching the first time length is used to determine that the first timer is expired; a moment when the first timer is expired is used to determine the second moment; a third moment is used to determine starting the first timer; the third moment is after the first moment, and an interval between the third moment and the first moment is equal to the first offset.

In one embodiment, a running time of a first timer being equal to the second time length is used to determine that the first timer is expired; a moment when the first timer is expired is used to determine the second moment; the first moment is used to determine starting the first timer.

In one embodiment, a first feedback is received; as a response to receiving the first feedback, a first timer is started; a running time of the first timer reaching the first time length is used to determine that the first timer is expired; a moment when the first timer is expired is used to determine the second moment; herein, the first feedback is used to determine that the first radio signal is relayed and forwarded.

In one embodiment, the second message carries first information, and the first information is used to trigger the first feedback.

In one embodiment, the third transmitter 1501 comprises the antenna 420, the transmitter 418, the multi-antenna transmitting processor 471, the transmitting processor 416, the controller/processor 475 and the memory 476 in FIG. 4 of the present application.

In one embodiment, the third transmitter 1501 comprises the antenna 420, the transmitter 418, the multi-antenna transmitting processor 471 and the transmitting processor 416 in FIG. 4 of the present application.

In one embodiment, the third transmitter 1501 comprises the antenna 420, the transmitter 418 and the transmitting processor 416 in FIG. 4 of the present application.

In one embodiment, the third receiver 1502 comprises the antenna 420, the receiver 418, the multi-antenna receiving processor 472, the receiving processor 470, the controller/processor 475 and the memory 476 in FIG. 4 of the present application.

In one embodiment, the third receiver 1502 comprises the antenna 420, the receiver 418, the multi-antenna receiving processor 472 and the receiving processor 470 in FIG. 4 of the present application.

In one embodiment, the third receiver 1502 comprises the antenna 420, the receiver 418 and the receiving processor 470 in FIG. 4 of the present application.

The ordinary skill in the art may understand that all or part of steps in the above method may be implemented by instructing related hardware through a program. The program may be stored in a computer readable storage medium, for example Read-Only Memory (ROM), hard disk or compact disc, etc. Optionally, all or part of steps in the above embodiments also may be implemented by one or more integrated circuits. Correspondingly, each module unit in the above embodiment may be realized in the form of hardware, or in the form of software function modules. The user equipment, terminal and UE include but are not limited to Unmanned Aerial Vehicles (UAVs), communication modules on UAVs, tele-controlled aircrafts, aircrafts, diminutive airplanes, mobile phones, tablet computers, notebooks, vehicle-mounted communication equipment, wireless sensors, network cards, Internet of Things (IoT) terminals, RFID terminals, NB-IoT terminals, Machine Type Communication (MTC) terminals, enhanced MTC (eMTC) terminals, data card, network cards, vehicle-mounted communication equipment, low-cost mobile phones, low-cost tablets and other wireless communication devices. The UE and terminal in the present application include but not limited to unmanned aerial vehicles, communication modules on unmanned aerial vehicles, tele-controlled aircrafts, aircrafts, diminutive airplanes, mobile phones, tablet computers, notebooks, vehicle-mounted communication equipment, wireless sensor, network cards, terminals for Internet of Things, RFID terminals, NB-IoT terminals, Machine Type Communication (MTC) terminals, enhanced MTC (eMTC) terminals, data cards, low-cost mobile phones, low-cost tablet computers, etc. The base station or system device in the present application includes but is not limited to macro-cellular base stations, micro-cellular base stations, home base stations, relay base station, gNB (NR node B), Transmitter Receiver Point (TRP), and other radio communication equipment.

The above are merely the preferred embodiments of the present application and are not intended to limit the scope of protection of the present application. Any modification, equivalent substitute and improvement made within the spirit and principle of the present application are intended to be included within the scope of protection of the present application.

What is claimed is:

1. A first node for wireless communications, comprising:
a first receiver, receiving a first signaling; at a second moment, as a response to not receiving a third message, determining performing a first procedure; and
a first transmitter, setting contents of a second message at a first moment; transmitting a first radio signal, the first radio signal comprising the second message;
wherein the first signaling is used to determine a first time length; the second message comprises link maintenance related information; the third message is triggered by the second message; the second moment is after the first moment and its interval with the first moment is a second time length, and the first time length is used to determine the second time length; the second time length is related to whether the second message is relayed.

2. The first node according to claim 1, comprising:
the first receiver, which receives a second signaling;
wherein the second signaling indicates a first offset, the first offset and the first time length are used to determine the second time length.

3. The first node according to claim 2, comprising:
the first receiver, when a running time of a first timer reaches the first time length, determining that the first timer is expired; a moment when the first timer is expired being used to determine the second moment;
wherein a third moment is used to determine starting the first timer; the third moment is after the first moment, and an interval between the third moment and the first moment is equal to the first offset.

4. The first node according to claim 1, comprising:
the first receiver, when a running time of a first timer is equal to the second time length, determining that the first timer is expired; a moment when the first timer is expired is used to determine the second moment;
wherein the first moment is used to determine starting the first timer.

5. The first node according to claim 1, comprising:
the first receiver, receiving a first feedback; as a response to receiving the first feedback, starting a first timer; a running time of the first timer reaching the first time length is used to determine that the first timer is expired; a moment when the first timer is expired is used to determine the second moment;
wherein the first feedback is used to determine that the first radio signal is relayed and forwarded.

6. The first node according to claim 5, wherein the second message carries first information, and the first information is used to trigger the first feedback.

7. The first node according to claim 1, wherein the first signaling comprises SIB12 message; the first time length comprises at least one millisecond, and the first time length is configurable.

8. The first node according to claim 1, wherein a logical channel of the second message comprises a CCCH, and a signaling radio bearer of the second message comprises SRB0; the third message comprises an RRC message.

9. The first node according to claim 1, wherein the link maintenance comprises an RRC connection re-establishment; the second message comprises an RRCReestabilshmentRequest message; the third message comprises any of an RRCSetup message or an RRCReestabilshment message.

10. The first node according to claim 1, wherein the link maintenance comprises an RRC connection recovery; the second message comprises an RRCResumeRequest message or an RRCResumeRequest1 message; the third message comprises any of an RRCSetup message, or an RRCReject message, or an RRCRelease message, or an RRCResume message.

11. The first node according to claim 1, wherein the second message comprises an RRCSetupRequest message; the third message comprises any of an RRCSetup message or an RRCReject message.

12. The first node according to claim 1, wherein the second moment refers to a moment when a given timer expires.

13. The first node according to claim 12, wherein the given timer comprises timer T301.

14. The first node according to claim 12, wherein the given timer comprises timer T319.

15. The first node according to claim 12, wherein the given timer comprises timer T300.

16. A second node for wireless communications, comprising:
 a second receiver, monitoring a first radio signal, the first radio signal comprising a second message; and
 a second transmitter, as a response to receiving the first radio signal, transmitting a second radio signal, the second radio signal comprising a second message; or, as a response to not receiving the first radio signal, dropping transmitting a second radio signal;
 wherein a first signaling is received by a transmitter of the first radio signal; the first signaling is used to determine a first time length; the second message comprises link maintenance related information; contents of the second message are set at a first moment; at a second moment, as a response to not receiving a third message, a first procedure is determined to be performed; the third message is triggered by the second message; the second moment is after the first moment and its interval with the first moment is a second time length, and the first time length is used to determine the second time length; the second time length is related to whether the second message is relayed.

17. A third node for wireless communications, comprising:
 a third receiver, monitoring a second radio signal, the second radio signal comprising a second message; and
 a third transmitter, as a response to receiving the second message, transmitting a third message; or, as a response to not receiving the second message, dropping transmitting a third message;
 wherein a first radio signal is transmitted, the first radio signal comprises the second message; a first signaling is used to determine a first time length; the second message comprises link maintenance related information; contents of the second message are set at a first moment; at a second moment, as a response to not receiving a third message, a first procedure is determined to be performed; the third message is triggered by the second message; the second moment is after the first moment and its interval with the first moment is a second time length, and the first time length is used to determine the second time length; the second time length is related to whether the second message is relayed.

18. The third node according to claim 17, wherein the first signaling comprises SIB12 message; the first time length comprises at least one millisecond, and the first time length is configurable.

19. The third node according to claim 17, wherein a logical channel of the second message comprises a CCCH, and a signaling radio carrier of the second message comprises SRB0; the third message comprises an RRC message.

20. The third node according to claim 17, wherein the second moment refers to a moment when a given timer expires; and the given timer comprises timer T301 or timer T319 or timer T300.

* * * * *